United States Patent
Suzuki et al.

(10) Patent No.: US 10,353,373 B2
(45) Date of Patent: Jul. 16, 2019

(54) MACHINE TOOL THERMAL DISPLACEMENT AND MAGNIFICATION CORRECTION ADJUSTMENT

(71) Applicant: Yamazaki Mazak Corporation, Niwa-gun (JP)

(72) Inventors: Atsushi Suzuki, Niwa-gun (JP); Tsunekazu Ishida, Niwa-gun (JP); Toshihito Okuda, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 131 days.

(21) Appl. No.: 15/458,028

(22) Filed: Mar. 14, 2017

(65) Prior Publication Data

US 2017/0185063 A1    Jun. 29, 2017

Related U.S. Application Data

(63) Continuation of application No. PCT/JP2015/078588, filed on Oct. 8, 2015.

(30) Foreign Application Priority Data

Oct. 29, 2014    (JP) .................. 2014-220562

(51) Int. Cl.
*G05B 19/19*    (2006.01)
*B23Q 15/04*    (2006.01)
(Continued)

(52) U.S. Cl.
CPC .............. *G05B 19/19* (2013.01); *B23Q 15/04* (2013.01); *G05B 19/404* (2013.01);
(Continued)

(58) Field of Classification Search
CPC .................................................... G05B 19/18
(Continued)

(56) References Cited

U.S. PATENT DOCUMENTS

2002/0004688 A1    1/2002   Kojima et al.
2006/0089745 A1    4/2006   Suzuki et al.
(Continued)

FOREIGN PATENT DOCUMENTS

CN    102629121          8/2012
CN    102629121 A  *    8/2012
(Continued)

OTHER PUBLICATIONS

Mayr et al., "Thermal issues in machine tools" CIRP Annals 61(2), 2012, 79pgs (Year: 2012).*
(Continued)

*Primary Examiner* — Emilio J Saavedra
(74) *Attorney, Agent, or Firm* — Mori & Ward, LLP

(57) ABSTRACT

A machine tool includes a workpiece holding unit to hold a workpiece. A tool holding unit holds a tool. At least one of the workpiece holding unit and the tool holding unit is drivingly rotatable or drivingly movable in a predetermined direction to machine the workpiece with the tool. Temperature sensors are attached to members constituting the machine tool. An estimator calculates an environmental temperature system thermal displacement amount due to a heat source outside the machine tool. A correction magnification processor calculates an environmental temperature system thermal displacement correction amount. Another estimator calculates a driving system thermal displacement amount due to a heat source in the machine tool. A thermal displacement correction amount adder obtains and outputs a total thermal displacement correction amount based on which the machine tool performs thermal displacement correction control.

12 Claims, 15 Drawing Sheets

(51) Int. Cl.
  *G05B 19/404* (2006.01)
  *G05B 19/406* (2006.01)
  *B23Q 15/18* (2006.01)

(52) U.S. Cl.
  CPC ............ *G05B 19/406* (2013.01); *B23Q 15/18* (2013.01); *G05B 2219/37428* (2013.01); *G05B 2219/37582* (2013.01); *G05B 2219/49102* (2013.01); *G05B 2219/49205* (2013.01); *G05B 2219/49206* (2013.01); *G05B 2219/49209* (2013.01)

(58) Field of Classification Search
  USPC .................................................... 700/170, 22
  See application file for complete search history.

(56) References Cited

U.S. PATENT DOCUMENTS

| | | | |
|---|---|---|---|
| 2013/0190921 A1 | 7/2013 | Maekawa | |
| 2013/0223946 A1* | 8/2013 | Yamamoto | G05B 19/404 409/80 |
| 2013/0325164 A1 | 12/2013 | Wwatanabe et al. | |
| 2014/0163738 A1 | 6/2014 | Suzuki | |

FOREIGN PATENT DOCUMENTS

| | | |
|---|---|---|
| CN | 102658499 | 9/2012 |
| CN | 102736557 | 10/2012 |
| CN | 103153534 | 6/2013 |
| CN | 102629121 B | 4/2014 |
| JP | 60-228055 | 11/1985 |
| JP | 03-079256 | 4/1991 |
| JP | 04-019042 | 1/1992 |
| JP | 3405965 B2 | 1/2002 |
| JP | 2002-239872 | 8/2002 |
| JP | 2002-307263 | 10/2002 |
| JP | 2004-030421 | 1/2004 |
| JP | 2006-116663 | 5/2006 |
| JP | 2009-238164 | 10/2009 |
| JP | 2009238164 A * | 10/2009 |
| JP | 2012-86326 | 5/2012 |
| JP | 2013-146823 | 8/2013 |
| JP | 5295467 B2 | 9/2013 |
| JP | 5490304 B2 | 5/2014 |

OTHER PUBLICATIONS

Ramesh et al., "Error compensation in machine tools—a review: Part II: thermal errors" International Journal of Machine Tools and Manufacture, vol. 40, Issue 9, Jul. 2000, pp. 1257-1284 (Year: 2000).*
Chinese Office Action for corresponding CN Application No. 201580030647.1, dated Jul. 25, 2017.
Written Opinion for corresponding International Application No. PCT/JP2015/078588, dated Dec. 1, 2015.
Extended European Search Report for corresponding EP Application No. 15854385.0-1927, dated Oct. 11, 2017.
International Search Report for corresponding International Application No. PCT/JP2015/078588, dated Dec. 1, 2015.
Japanese Office Action for corresponding JP Application No. 2016-509226, dated Jun. 14, 2016 (w/ English machine translation).
European Office Action for corresponding EP Application No. 15854385.0-1205, dated Sep. 4, 2018.

* cited by examiner

F I G. 5
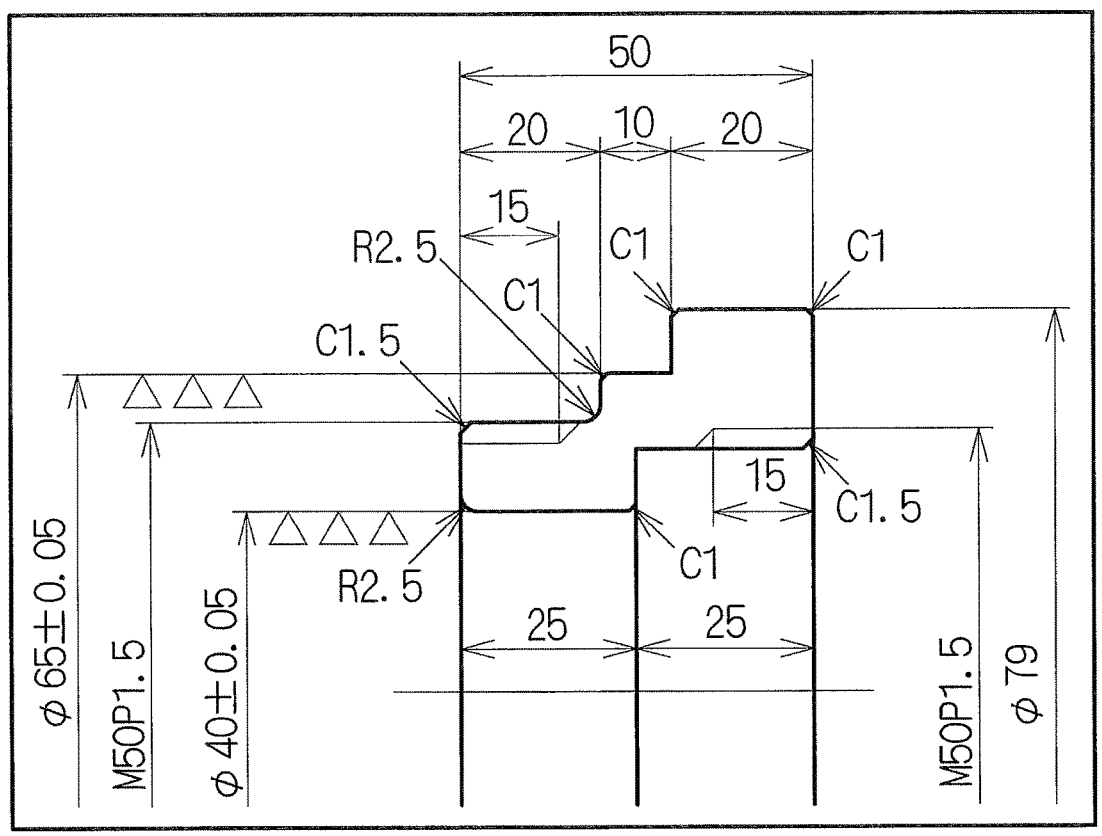

FIG. 6
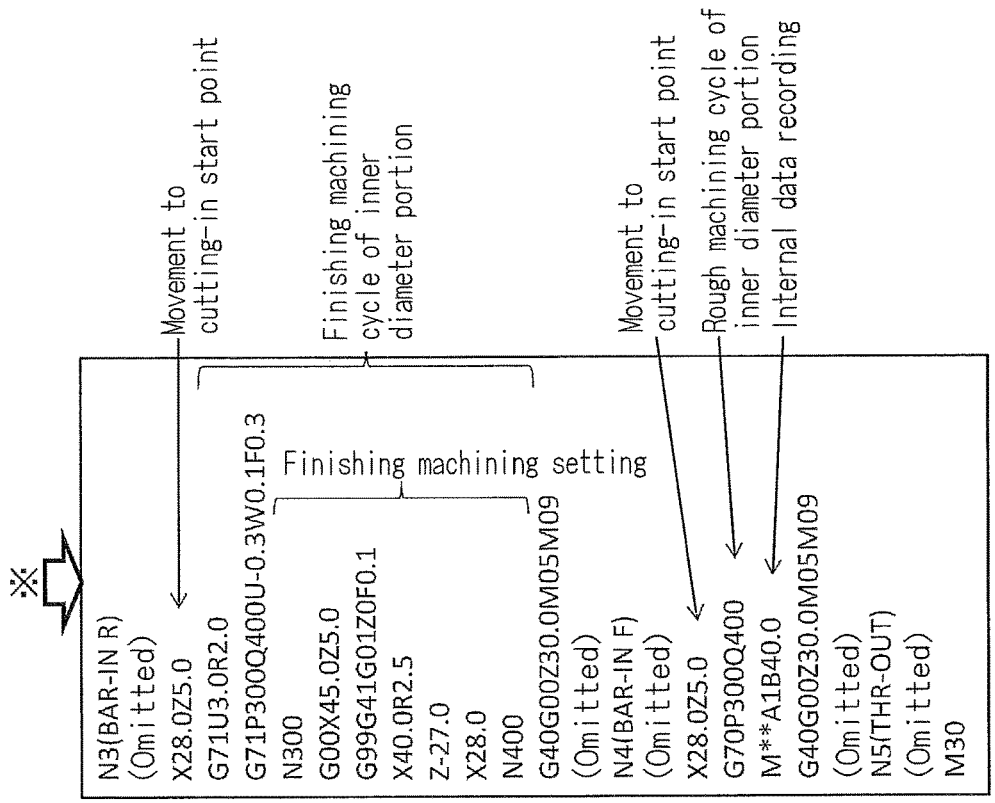
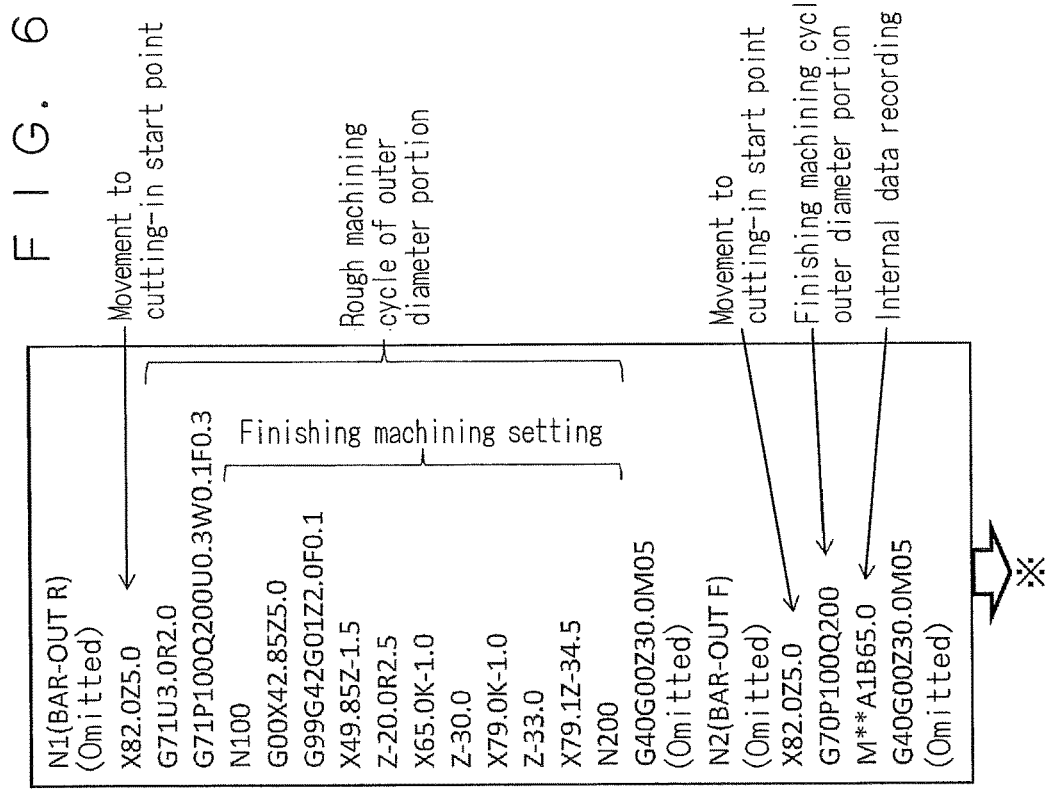

F I G. 7A

| WNO | DATE | TIME | TNO | CAx | TSz | MSz | A$WV | A$B | A$HCX | A$HCY | A$HCZ |
|---|---|---|---|---|---|---|---|---|---|---|---|
| | | | | | | | | | | | |
| | | | | | | | | | | | |
| | | | | | | | | | | | |

250

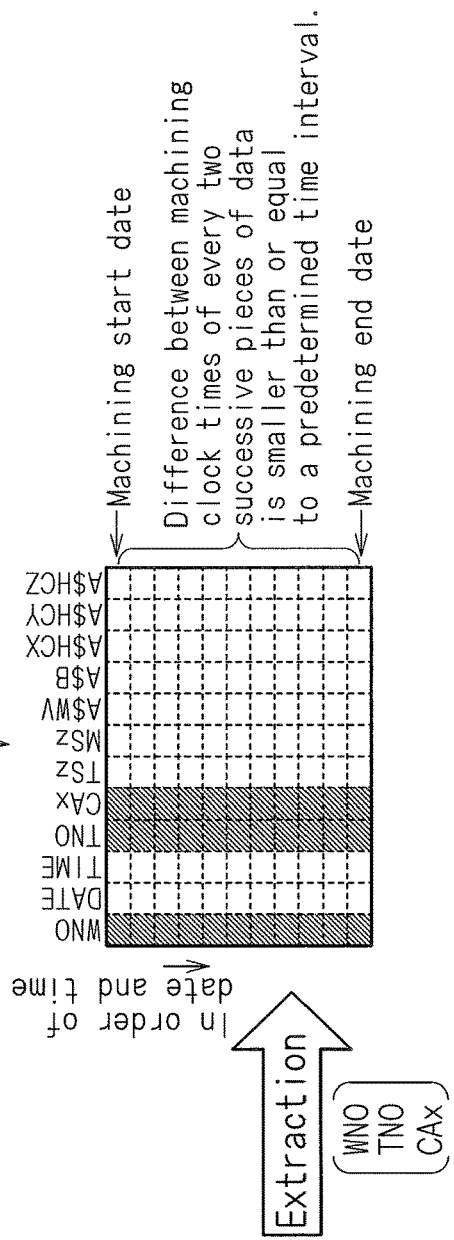
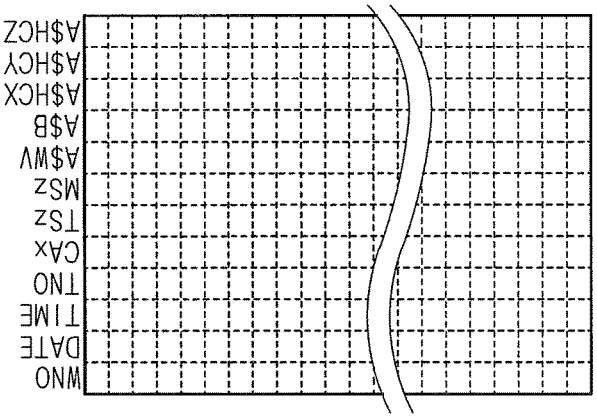
FIG. 7B

F I G. 1 2
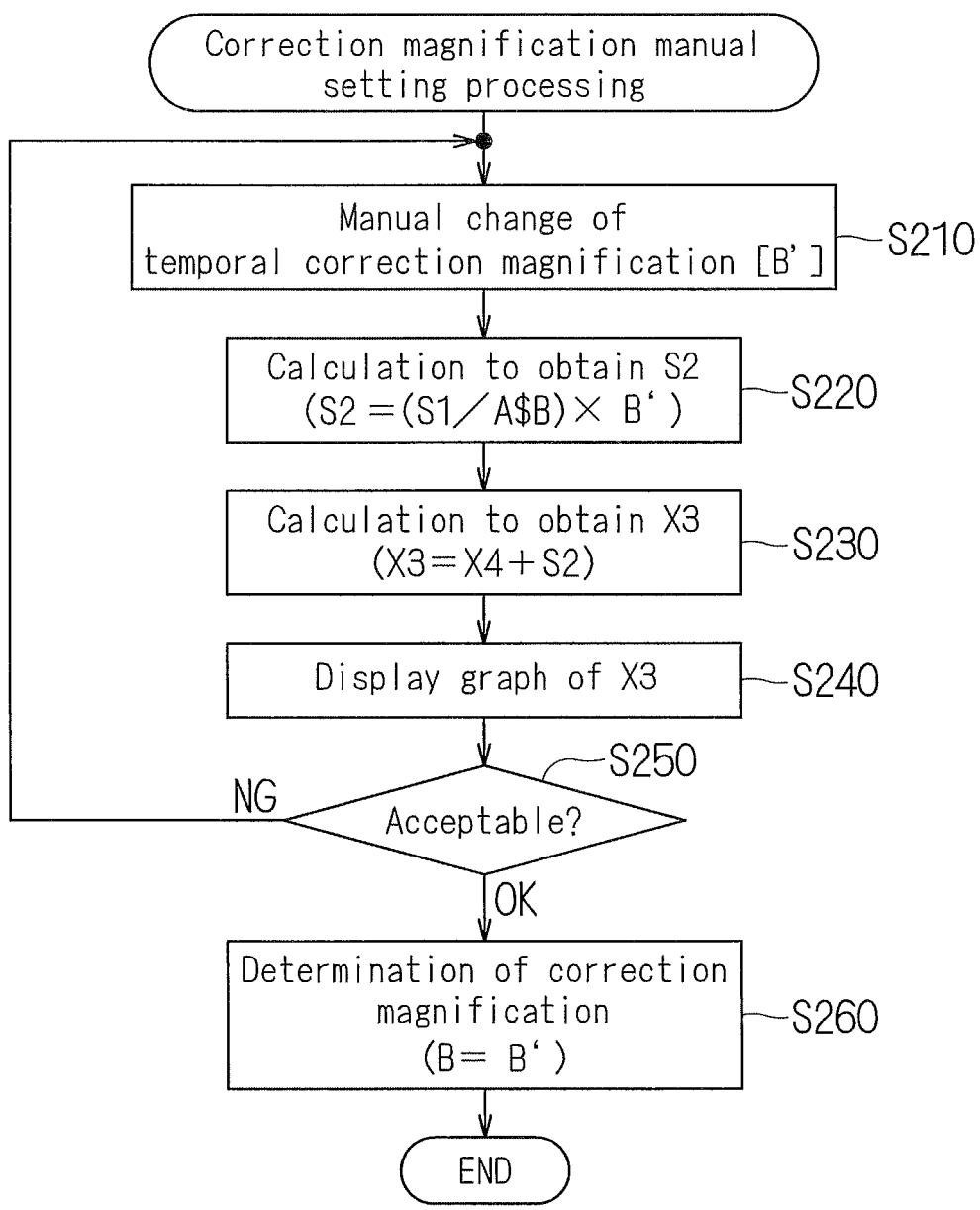

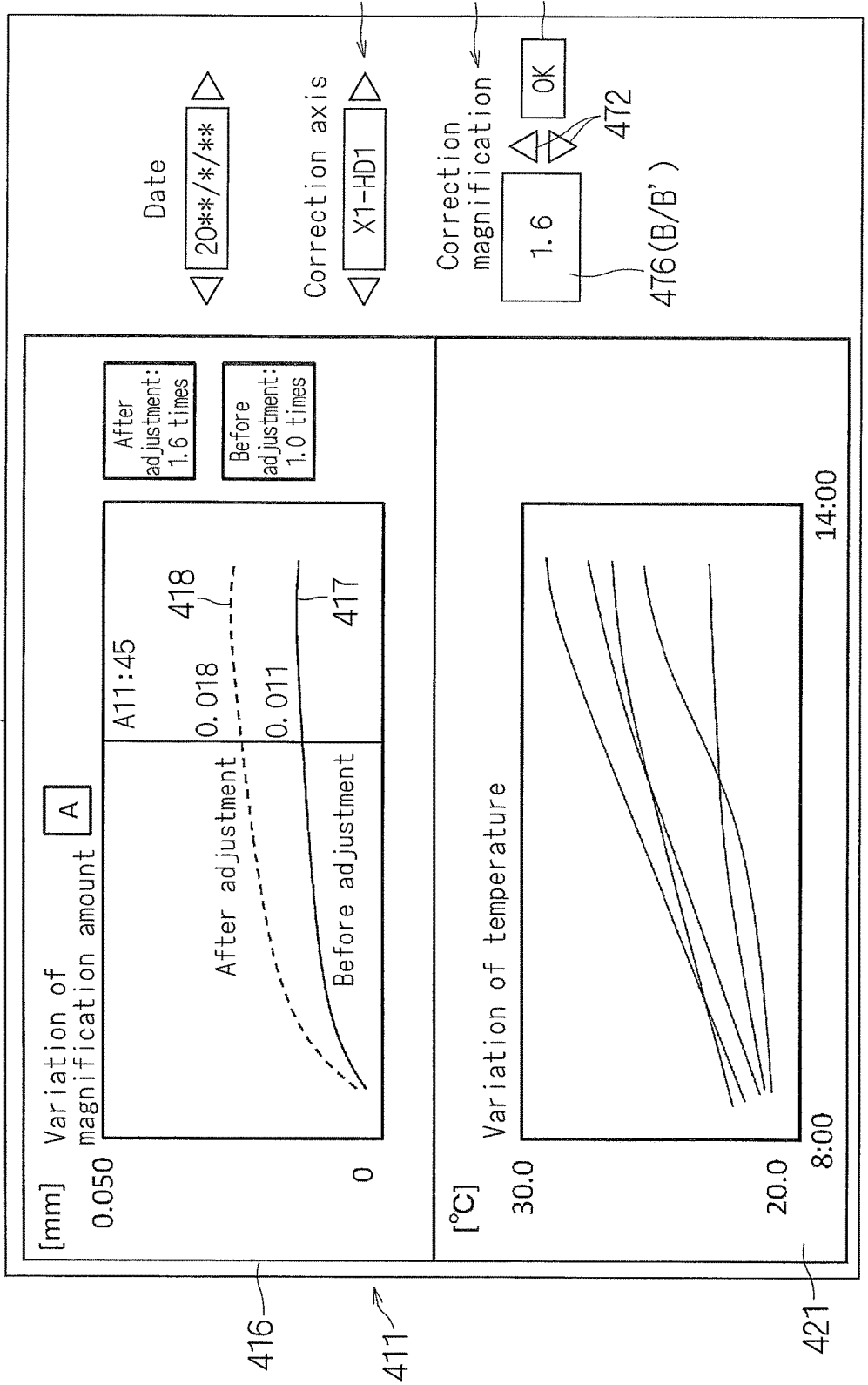

MACHINE TOOL THERMAL DISPLACEMENT AND MAGNIFICATION CORRECTION ADJUSTMENT

CROSS-REFERENCE TO RELATED APPLICATIONS

The present application is a continuation application of International Application No. PCT/JP2015/078588, filed Oct. 8, 2015, which claims priority to Japanese Patent Application No. 2014-220562, filed Oct. 29, 2014. The contents of these applications are incorporated herein by reference in their entirety.

BACKGROUND OF THE INVENTION

Field of the Invention

The present invention relates to a machine tool.

Discussion of the Background

A thermal expansion of each of members constituting a machine tool due to heat generated by operating the machine tool and heat from the surroundings of the machine tool is a significant cause that brings the relationship in position between a blade edge of a tool and a machining workpiece to a misaligned state. As a result, the machining accuracy may be deteriorated. Such a misalignment due to heat in the relationship in position between the blade edge of the tool and the machining workpiece will be referred to as a thermal displacement hereinafter. In general, an NC device for controlling the machine tool includes the function of correcting the thermal displacement. In this thermal displacement correction function, a method that allows each of temperature sensors to be attached to a corresponding one of portions of major members constituting the machine tool, and that allows temperature values each resulting from multiplying a temperature value at a corresponding one of the portions by a coefficient to be summed to obtain a thermal displacement correction amount is generally employed. There are, however, a large number of and various heat sources each likely to be a cause of the thermal displacement, and further, for each of all members subjected to the influence of heat, the degree and a direction a thermal expansion of the each member are needed to be taken into consideration. Further, it is extremely difficult to accurately analyze all causes and make thermal corrections with high accuracy. In particular, a temperature variation due to external causes existing outside the machine tool is unanalyzable in principle, and thus, the thermal displacement is extremely difficult to correct with accuracy.

In a thermal displacement correction control device disclosed in Japanese Patent No. 5490304, the position of a reference ball disposed at the outside of a machining area is measured at intervals of a predetermined period of time to obtain a displacement amount of the ball and record the displacement amount together with temperatures of a plurality of portions. With respect to the value of a coefficient for use in a calculation formula for estimating a thermal displacement amount using the temperatures of the plurality of portions, an equation for obtaining the coefficient is created by substituting a plurality of the recorded displacement amounts and a plurality of the recorded temperatures into the estimation calculation formula to solve the equation and obtain an optimum value for the coefficient. Further, displacement amounts resulting from measuring the reference position, displacement amounts of the reference position resulting from correcting the displacement amounts using a currently effective thermal displacement correction coefficient, and displacement amounts of the reference position resulting from applying a thermal displacement correction coefficient having been obtained through the above calculation are each displayed in the form of a graph to allow a worker to select acceptance or rejection in relation to the employment of the thermal displacement correction coefficient, which has been obtained through the above calculation.

In a device disclosed in Japanese Unexamined Patent Application Publication No. 60-228055, machining sizes during a period of time that is immediately after the start of a machining operation and that is when the thermal status has been stable are recorded together with clock times, and afterward, when a machining operation is performed on the same workpiece, a thermal correction is made on the basis of a recorded period of time from the start of the machining operation and a recorded machining size at that time point. This configuration enables obtaining satisfactory machining sizes even in a thermally unstable state immediately after the start of the machining operation.

Further, in a device disclosed in Japanese Unexamined Patent Application Publication No. 2006-116663, a spindle speed and a spindle load are detected, and through the use of a calculation formula based on a previously estimated thermal displacement, an actual thermal displacement amount is estimated to correct the thermal displacement.

SUMMARY OF THE INVENTION

According to one aspect of the present invention, a machine tool includes a workpiece holding unit, a tool holding unit, a plurality of temperature sensors, an environmental temperature system thermal displacement amount estimator, a correction magnification processor, a driving system thermal displacement amount estimator, and a thermal displacement correction amount adder. The workpiece holding unit is configured to hold a workpiece. The tool holding unit is configured to hold a tool. At least one of the workpiece holding unit and the tool holding unit is configured to be drivingly rotated. At least one of the workpiece holding unit and the tool holding unit is configured to be drivingly moved in a predetermined direction so as to machine the workpiece with the tool. The plurality of temperature sensors are attached to members constituting the machine tool. The environmental temperature system thermal displacement amount estimator is configured to calculate an environmental temperature system thermal displacement amount due to a heat source existing outside the machine tool, based on temperature values each measured by a corresponding one of the plurality of temperature sensors. The correction magnification processor is configured to multiply a calculation-based thermal displacement correction amount for compensating the environmental temperature system thermal displacement amount by a correction magnification to calculate an environmental temperature system thermal displacement correction amount. The correction magnification adjustment operator is configured to adjust the correction magnification. The driving system thermal displacement amount estimator is configured to calculate a driving system thermal displacement amount due to a heat source included in the machine tool itself, based on a rotation driving state and a movement driving state of each of the workpiece holding unit and the tool holding unit. The thermal displacement correction amount adder is configured to add the environmental temperature system thermal displacement correction amount to a driving system thermal displacement correction amount for compensating the driving system thermal displacement amount to obtain and output a total thermal displacement correction amount based on which the machine tool performs thermal displacement correction control.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 5 is a diagram illustrating a machining drawing for use in a machining operation using the machine tool according to the embodiment;

FIG. 6 is a diagram illustrating a machining program for use in the embodiment;

FIGS. 7A and 7B are diagrams illustrating a data structure of internally recorded machining state data in the embodiment;

FIG. 12 is a diagram illustrating a flowchart when the correction magnification according to first embodiment is manually set;

FIG. 14 is a diagram illustrating a display screen according to third embodiment.

DESCRIPTION OF THE EMBODIMENTS

Hereinafter, an embodiment according to the present invention will be described by way of embodiments on the basis of the drawings. Further, with respect to a correction magnification setting support function, it will be described in the form of separate sections, embodiments 1 to 3.

Configuration of Machine

Figure 1:
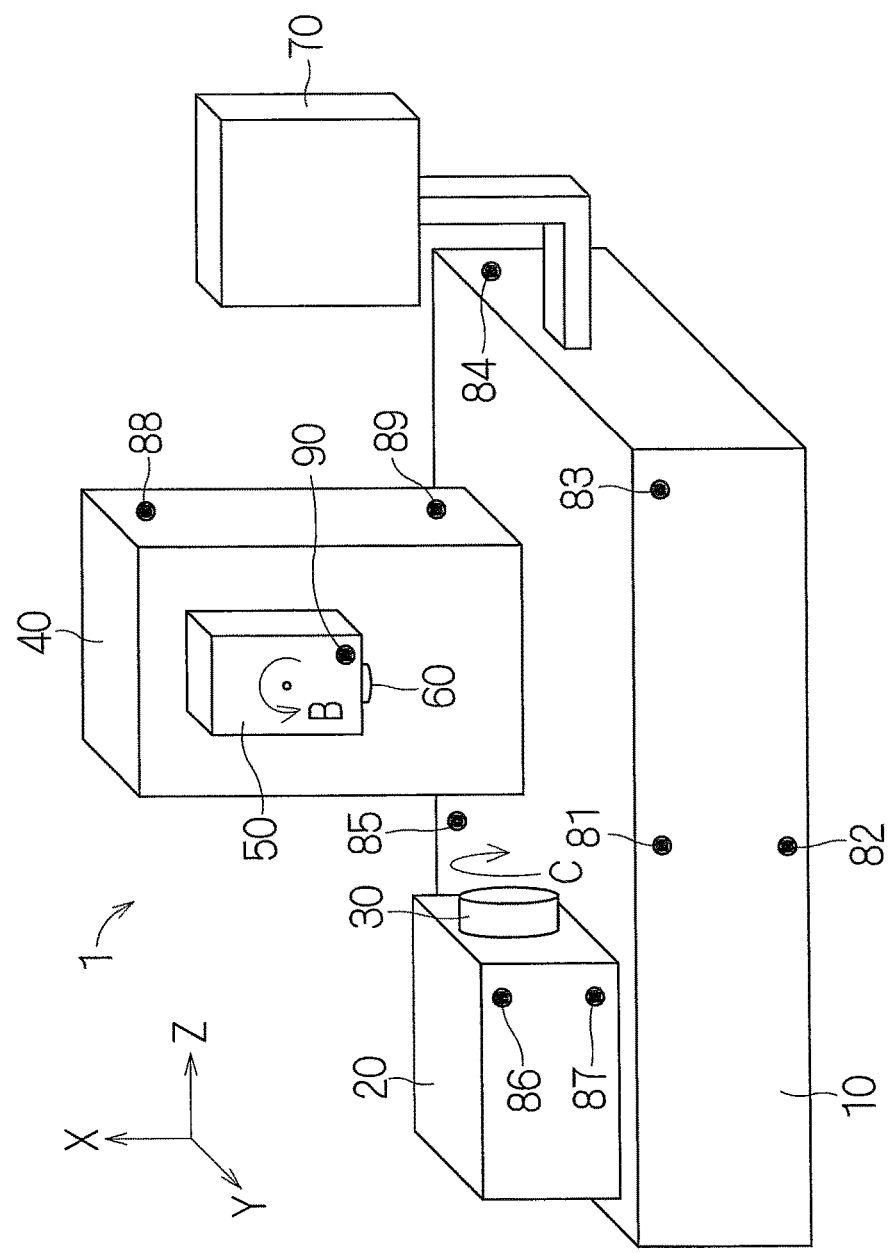
FIG. 1 is a perspective view of a machine tool according to an embodiment of the present invention illustrating a configuration of the machine tool.

FIG. 1 illustrates a main configuration of a machine tool 1 according to the embodiment. The machine tool 1 includes a bed 10, a workpiece headstock 20, a workpiece spindle 30, a column 40, a tool headstock 50, a tool spindle 60, and an NC device 70. The workpiece headstock 20 is secured to the bed 10. The workpiece spindle 30 is mounted on the workpiece headstock 20 so as to be freely rotatable in a C-axis direction. The column 40 is disposed so as to be movable in Y-axis and Z-axis directions on the bed 10. The tool headstock 50 is disposed so as to be movable in the X-axis direction and a B-axis direction on the column 40. The tool spindle 60 is disposed on the tool headstock 50 so as to be freely rotatable. The NC device 70 controls these constituent members. A tool securely held by the tool spindle 60, a tool holding unit, machines a workpiece securely held by a chuck (not illustrated), a work holding unit, secured to the workpiece spindle 30. Further, as shown in FIG. 1, temperature sensors 81 to 90 (each denoted by a symbol "•" in FIG. 1) are attached to individual portions of the above constituent members. Specifically, a temperature sensor 81 is attached to somewhere in the bed 10 adjacent to a portion of the upper end of the bed 10, and a temperature sensor 82 is attached to somewhere in the bed 10 adjacent to a portion of the lower end of the bed 10. The portion of the upper end of the bed 10 and the portion of the lower end of the bed 10 are immediately below a machining region, and thus are largely affected by heat generated along with cutting of the workpiece. Further, other three temperature sensors 83 to 85 are attached to individual portions of the bed 10. Two temperature sensors 86 and 87 are attached to upper and lower portions of the workpiece headstock 20, and similarly, two temperature sensors 88 and 89 are attached to upper and lower portions of the column 40. Moreover, one temperature sensor 90 is also attached to a portion of the tool headstock 50. With these dispositions, temperatures of portions that affect attitude deformations of the respective members are measured.

Figure 2:
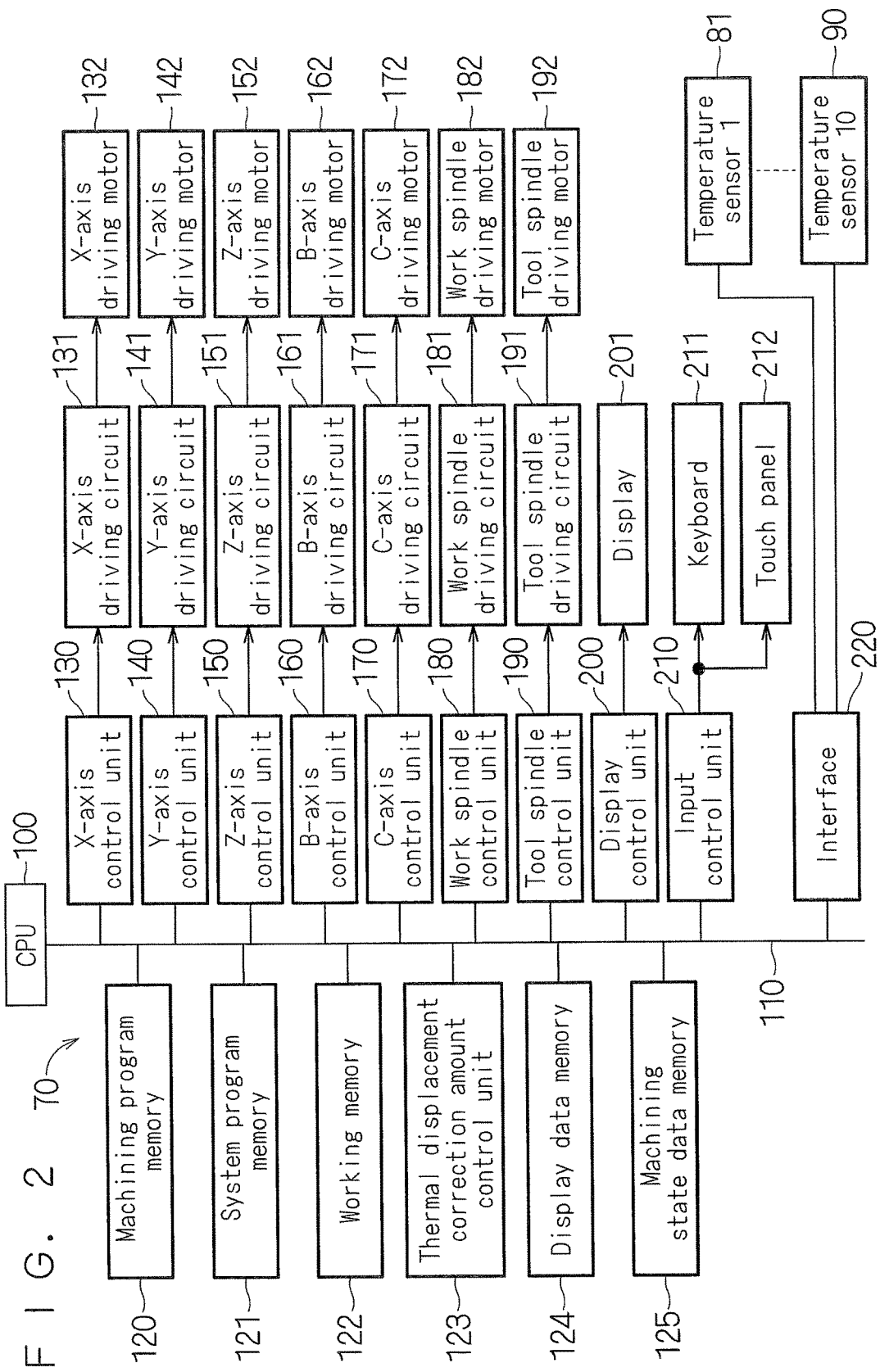
FIG. 2 is a diagram illustrating a hardware configuration of an NC device included in the machine tool according to the embodiment.

FIG. 2 is a diagram illustrating a hardware configuration of the NC device 70, which is provided in the machining tool 1.

The NC device 70 includes a CPU 100. This CPU 100 controls the entire machining tool 1.

Figure 7A:
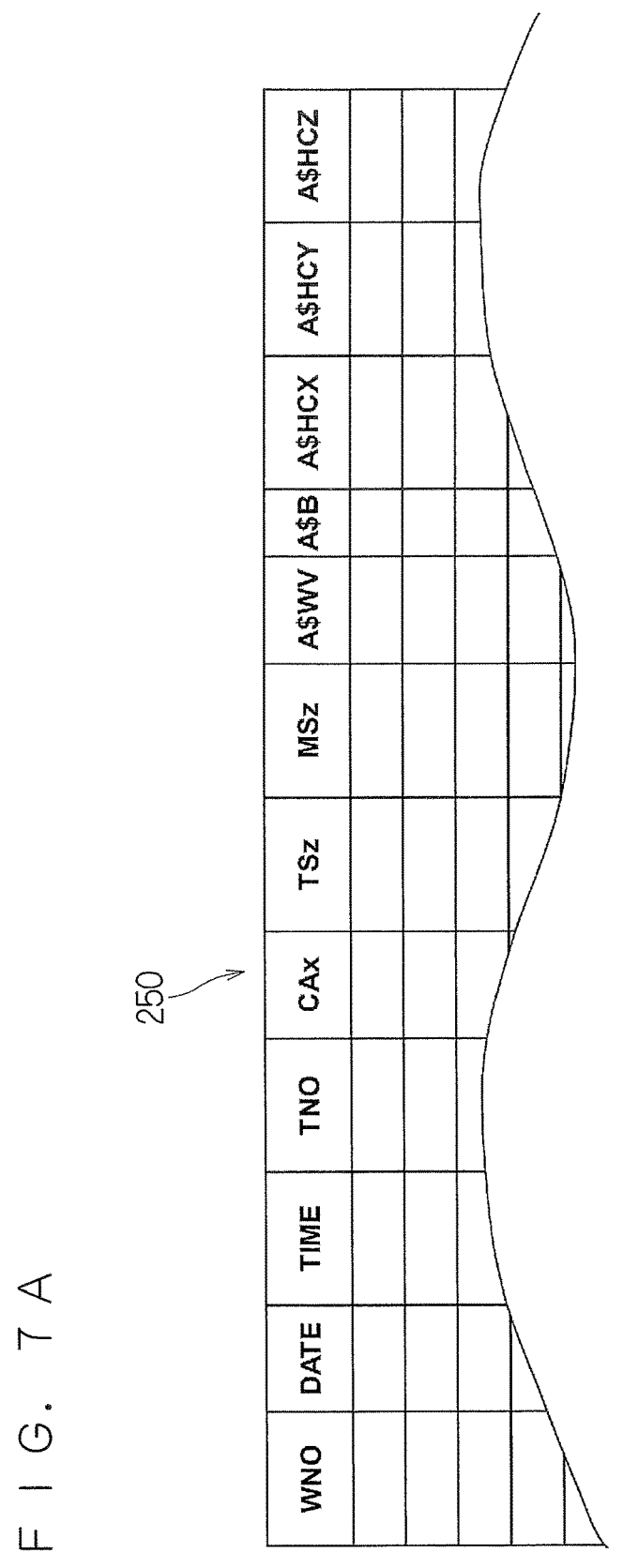

A plurality of components are coupled to the CPU 100 via a bus line 110, and the plurality of components includes a machining program memory 120, a system program memory 121, a working memory 122, a thermal displacement correction setting control unit 123, a display data memory 124, and a machining state data memory 125. The machining program memory 120 stores in itself a program in relation to a machining operation. The system program memory 121 stores in itself a program that controls the entire machining tool 1 (system). The display data memory 124 stores in itself display data for use in a display operation by a display. The machining state data memory 125 stores in itself pieces of machining state data 250 (FIGS. 7A and 7B). These pieces of machining state data 250 are records of internal statuses and any other record target information that are possessed by the NC device 70 during a machining operation. Here, the machining state data 250 is an example of the environmental temperature system thermal displacement correction record data, and is data for use in a graph display of a temporal transition of environmental temperature system thermal displacement corrections.

Further, a display control unit 200 and an input control unit 210 are coupled to the CPU 100 via the bus line 110. The display control unit 200 controls the display of a display 201. The input control unit 210 receives inputs from a keyboard 211 disposed on an operation board, and receives inputs from a touch panel 212 disposed on the display 201.

Further, the display data memory 124 stores, in itself, not only various kinds of display data for use in displaying on the display 201, but also screen display image information for, in this embodiment, a machining state data input/display section 450, a machining size graph display section 412, and a temperature graph display section 421 in each of correction magnification setting support screens 400 (FIG. 8) and 401 (FIG. 13), and other kinds of screen display image information for, for example, a machining program.

Moreover, an X-axis control unit 130, a Y-axis control unit 140, a Z-axis control unit 150, a B-axis control unit 160, a C-axis control unit 170, a workpiece spindle control unit 180, and a tool spindle control unit 190 are coupled to the CPU 100 via the bus line 110. When each of the above control units has received a corresponding one of axis movement commands, the each of the above control units outputs a movement command to a corresponding one of axis driving circuits, that is, an X-axis driving circuit 131, a Y-axis driving circuit 141, a Z-axis driving circuit 151, a B-axis driving circuit 161, a C-axis driving circuit 171, a workpiece spindle driving circuit 181, and a tool spindle driving circuit 191. Further, when each of these axis driving circuits has received the movement commands, the each of the axis driving circuits drives a corresponding one of driving motors, that is, an X-axis driving motor 132, a Y-axis driving motor 142, a Z-axis driving motor 152, a B-axis driving motor 162, a C-axis driving motor 172, a workpiece spindle driving motor 182, and a tool spindle driving motor 192.

Here, it should be noted that the NC device 70 is constituted by the above constituent components, but is not limited to the above constituent components. For example, the above kinds of memories may be integrated into a single memory, and a region inside the single memory may be partitioned into a plurality of regions in each of which one of the kinds of programs and the kinds of data is stored.

Further, as shown in FIG. 1, the temperature sensors 81 to 90 are attached to portions of the individual constituent members, temperature detection signals from the temperature sensors are input to the CPU 100 via an interface 220 and the bus line 110.

Further, the thermal displacement correction setting control unit 123 performs processing for recording measured temperature values obtained from the temperature sensors 81 to 90 via the interface 220 and internal variables generated in the working memory 122 during processes for NC control into the machining state data memory 125 as the machining state data memory 250 (FIGS. 7A and 7B); processing for generating a screen image for supporting the setting change of the thermal displacement correction value, and writing the generated screen image into the display data memory 124; and any other processing.

Calculation of Thermal Displacement Correction Amount

Figure 3:
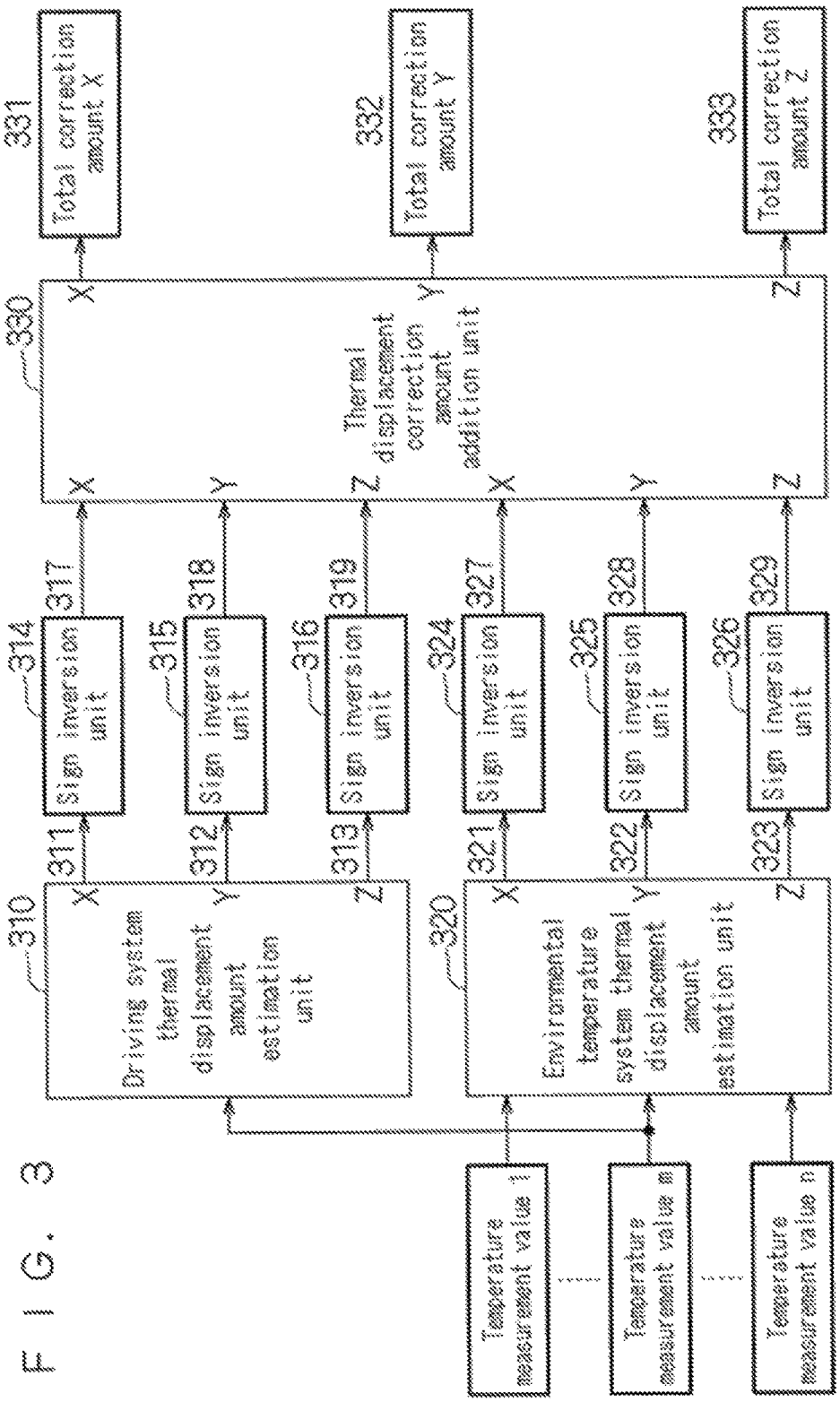
FIG. 3 is a block diagram illustrating a configuration that allows a thermal displacement correction amount to be estimated using two systems of thermal displacement correction formulas.

FIG. 3 illustrates a block diagram of a configuration of thermal displacement correction control based on thermal displacement amounts estimated by two systems of thermal displacement amount estimation units, that is, a driving system thermal displacement amount estimation unit (a driving system thermal displacement amount estimator) 310 and an environmental temperature system thermal displacement amount estimation unit (an environmental temperature system thermal displacement amount estimator) 320.

The driving system thermal displacement amount estimation unit 310 respectively calculates and obtains driving system thermal displacement amounts 311, 312, and 313 in relation to the X-axis, Y-axis, and Z-axis by means of, for example, a method described in Japanese Unexamined Patent Application Publication No. 2006-116663 on the basis of status values and specified values in relation to a driving system, or part of temperature measurement values. The environmental temperature system thermal displacement amount estimation unit 320 respectively calculates and obtains environmental temperature system thermal displacement amounts 321, 322, and 323 in relation to the X-axis, the Y-axis, and the Z-axis on the basis of a plurality of temperature measurement values 1 to n. The driving system thermal displacement amount estimation unit 310 and the environmental temperature system thermal displacement amount estimation unit 320 make their respective estimations independently from each other.

In order to calculate correction amounts for use in compensating displacement amounts, the signs of the displacement amounts 311, 312, and 313, which are associated with the respective X-axis, Y-axis, and Z-axis and have been calculated by the driving system thermal displacement amount estimation unit 310, and the signs of the displacement amounts 321, 322, and 323, which are associated with the respective X-axis, Y-axis, and Z-axis and have been calculated by the environmental temperature system thermal displacement amount estimation unit 320, are respectively inverted by sign inversion units 314, 315, and 316 and sign inversion units 324, 325, and 326 to calculate driving system thermal displacement correction amounts 317, 318, and 319 and calculation-based thermal displacement correction amounts 327, 328, and 329.

Next, the driving system thermal displacement correction amounts 317, 318, and 319 are respectively added to the calculation-based thermal displacement correction amounts 327, 328, and 329 by a thermal displacement correction amount addition unit (a thermal displacement correction amount adder) 330 to calculate total thermal displacement correction amounts 331, 332, and 333 associated with the respective X-axis, Y-axis, and Z-axis, and then, the thermal displacement correction control is performed.

As described above, a highly accurate calculation value is obtained in the calculation of the driving system thermal displacement value, whereas, in the calculation of the environmental temperature system thermal displacement value, there has sometimes occurred a situation in which a highly accurate calculation value is not obtained because of the installation environment of the machine tool and any other reason.

Figure 4:
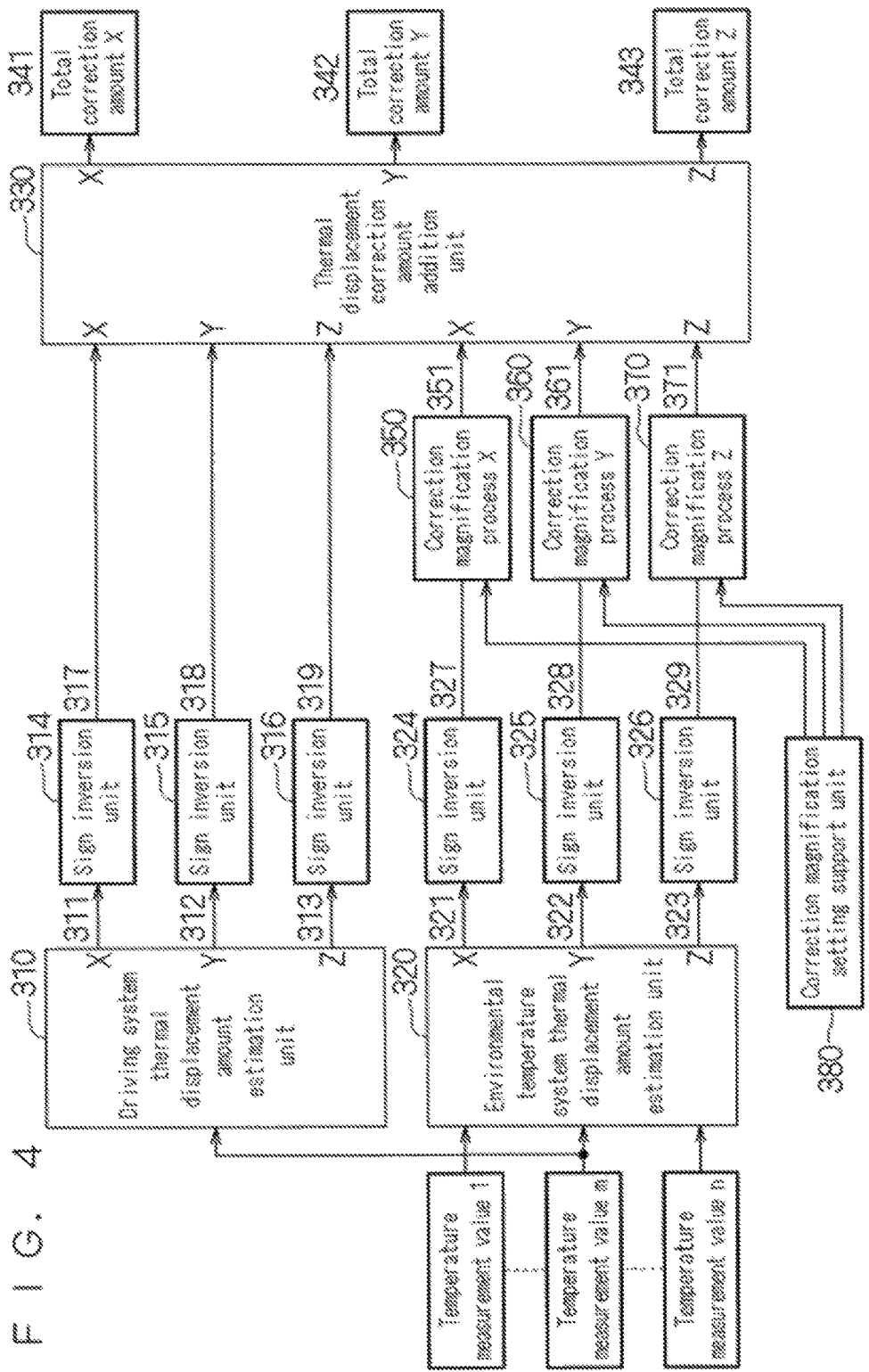
FIG. 4 is a block diagram illustrating a configuration that allows a thermal displacement correction amount to be estimated taking a correction magnification into account in one of the two systems.

FIG. 4 illustrates a block diagram of a configuration of thermal displacement correction control based on the result of calculation of thermal displacement amounts by correction magnification processes 350, 360, and 370, processes added to the processing blocks illustrated in FIG. 3. The correction magnification processes 350, 360, and 370 respectively multiply the calculation-based thermal displacement correction amounts 327, 328, and 329 by correction magnifications Bx, By, and Bz to calculate environmental temperature system thermal displacement correction amounts 351, 361, and 371. The correction magnifications Bx, By, and Bz are respectively and independently set to the X-axis, the Y-axis, and the Z-axis. After the above calculation, in a way similar to that shown in FIG. 3, the driving system thermal displacement correction amounts 317, 318, and 319 are respectively added to the environmental temperature system thermal displacement correction amounts 351, 361, and 371 by the thermal displacement correction amount addition unit 330 to calculate total thermal displacement correction amounts 341, 342, and 343 associated with the respective X-axis, Y-axis, and Z-axis, and then, the thermal displacement correction control is performed. Further, a correction magnification setting support unit 380 is provided to determine the correction magnifications Bx, By, and Bz. Correction magnification setting support screens 400, 401, and 403 are specific examples of the correction magnification setting support unit 380, and will be described later.

Herein, a formula and a coefficient for estimating the environmental temperature system thermal displacement amounts are sometimes unfamiliar or difficult to understand for a worker. Such a worker is able to, through his or her feeling, understand that estimated thermal displacement amounts are different from actual thermal displacement amounts, but the worker is usually unable to determine what value the correction magnification is to be changed to in order to achieve an accurate thermal displacement correction. For this reason, the correction magnification setting support unit 380 displays screens that are so understandable that the worker is able to make a determination through his or her feeling. This configuration enables the worker to perform a manual setting, and further, allows an optimum correction magnification to be calculated automatically.

Here, it should be noted that the environmental temperature system thermal displacement amount and the environmental temperature system thermal displacement correction amount are expressions that are caused to be associated with the driving system thermal displacement amount and the driving system thermal displacement correction amount, and means that the estimation calculation formula for the environmental temperature system thermal displacement amount does not include any one of elements of the driving system. The elements of the driving system mean a specified value, a movement speed, a spindle speed, a driving current value, and any other similar element in relation to a movement object or a rotation object.

Further, in FIGS. 3 and 4, the driving system thermal displacement amount estimation unit 310 is represented by one box, but the workpiece spindle, the tool spindle, the X-axis, the Y-axis, the Z-axis, the B-axis, and the C-axis exist as driving systems. Further, it is difficult to obtain each of their thermal displacement amounts using a corresponding one of calculation formulas having the same structure, and thus, an estimation unit may be provided for each of the driving systems to calculate a corresponding one of driving system thermal displacement amount, and then, the total of the resultant driving system thermal displacement amounts may be obtained. Moreover, in a machine tool including a heat source or a cooling device that is definitely different from the above systems, a thermal displacement amount estimation unit associated with the heat generation source or the cooling device may be added.

Machining Operation

FIG. 5 illustrates a machining drawing for a machining workpiece according to this embodiment.

The machining workpiece according to this embodiment includes three steps in an outer diameter portion and two steps in an inner diameter portion, and a screw thread is cut at one end of the workpiece. A tolerance range is specified to each of a ϕ65 portion of the outer diameter portion and a ϕ40 portion of the inner diameter portion. When a tolerance range is specified in this way, a worker measures a post-machining size, and appropriately inputs a tool wear correction amount to cause a machining size to fall within the tolerance range.

FIG. 6 illustrates a machining program that allows a machining operation based on the machining drawing shown in FIG. 5 to be executed. The machining program is stored in the machining program memory 120. Individual steps of this machining program will be described below. In this description, however, portions unnecessary in the description of this embodiment will be appropriately omitted.

"N1(BAR-OUT R)" indicates the start of a step of an outer diameter rough machining operation.

"X82.0Z5.0" is a command for instructing a movement to a cutting-in start point of the outer diameter rough machining operation.

Two subsequent lines of commands each starting with "G71" are commands for defining pieces of specific data needed to execute the outer diameter rough machining operation.

"U3.0" and "R2.0" of a first line among the two lines each starting with "G71" respectively define a cutting-in depth: "0.3 mm" and a run-off distance: "2.0 mm" per one cutting operation. Although the detail of an outer diameter rough machining cycle is not described here, this outer diameter rough machining cycle is a cycle during which a cutting-in operation in the X-axis direction by 3.0 mm per one cutting-in operation and a cutting feed operation in the Z-axis direction are repeated a plurality of times until a defined shape is achieved. Incidentally, argument signs, "U" and "R", allow the outer diameter rough machining cycle and an inner diameter rough machining cycle to be switched to each other and allow a cutting feed direction to be switched between a −Z direction and a +Z direction (i.e., a machining direction of a workpiece held by a first spindle and a machining direction of a workpiece held by a second spindle).

"P100" and "Q200" of a second line among the two lines each starting with "G71" indicate a definition portion of a product shape to be formed during the rough machining cycle. That is, lines from "N100" up to "N200" correspond to the definition portion. Further, "U0.3", "W0.1", and "F0.3" respectively define a finishing allowance in the X-axis direction: 0.3 mm, a finishing allowance in the Z-axis direction: 0.1 mm, and a cutting feed rate in a rough machining operation: 0.3 mm per one rotation.

In subsequent lines from "N100" up to "N200", operational settings in a finishing machining operation are defined. A finishing shape, a nose-R compensation command, a feed rate in a finishing operation, and any other operational setting are defined in the course of the lines from "N100" up to "N200".

In a line immediately following "N200", that is, "G40G00Z30.0M05", the nose-R compensation, which has been instructed during the shape configuration, is cancelled ("G40") to move the tool away from the workpiece in the Z-axis direction and stop rotation of the spindle so as to terminate the outer diameter rough machining operation.

Next, "N2(BAR-OUT F)" indicates the start of a step of an outer diameter finishing machining operation.

Similarly to the outer diameter rough machining operation, "X82.0Z5.0" is a command for instructing a movement to a cutting-in start point of the outer diameter finishing machining operation.

"G70P100Q200" is a command for instructing execution of a finishing machining operation to achieve the machining shape having been defined in the course of the lines from "N100" up to "N200".

A subsequent command, "MA1B65.0", is a machining state data record command for instructing recording of internal data possessed by the NC device at a time when this command has been executed. The recorded internal data includes an under-execution workpiece number, a date and clock time, an in-use tool number as of then, an effective tool wear correction amount as of then, and an effective environmental temperature system thermal displacement correction amount as of then. Further, on the basis of an argument of "A" instructed simultaneously with "M", an axis corresponding to the argument is recorded as a correction axis. That is, the X-axis is recorded as the correction axis when "A" is "A1"; the Y-axis is recorded as the correction axis when "A" is "A2"; and the Z-axis is recorded as the correction axis when "A" is "A3". Moreover, "65.0 mm" is recorded as a target size on the basis of "B65.0". The recorded data is stored in the machining state data memory 125 as the machining state data 250 (FIGS. 7A and 7B), which will be described later. Here, the correction axis specifies an axis targeted for monitoring of the environmental temperature system thermal displacement correction amount. Thus, a tool wear correction amount to be recorded herein is an axis-direction element corresponding to an axis specified as a correction axis among axis-direction elements corresponding to the respective X-axis, Y-axis, and Z-axis. Further, a target size is an axis-direction size corresponding to an axis specified as a correction axis.

With respect to a subsequent inner diameter machining operation, its detailed description is omitted here since the inner diameter machining operation is almost the same as the machining operation for the outer diameter portion. Briefly speaking, immediately after, with "G71P300Q400", a finishing machining operation in the inner diameter machining operation has been performed on the basis of lines from "N300" up to "N400", with "M**A1B40.0", pieces of machining state data 250 as of then are stored in the machining state data memory 125.

Mid-Machining State Data

FIG. 7A illustrates a diagram of a data structure of pieces of machining state data 250 recorded in this embodiment.

The pieces of machining state data 250 are composed of workpiece numbers WNO, machining dates DATE, machining clock times TIME, tool numbers TNO, correction axes CAx, target machining sizes TSz, achieved machining sizes MSz, tool wear correction amounts A$WV, correction magnifications A$B, environmental temperature system thermal displacement correction amounts X [A$HCX], environmental temperature system thermal displacement correction amounts Y [A$HCY], and environmental temperature system thermal displacement correction amounts Z [A$HCZ]. Every time "M" in the machining program shown in FIG. 6 is executed, pieces of data corresponding to an under-execution workpiece number WNO, a machining date DATE, a machining clock time TIME, a tool number TNO of an in-use tool as of then, a correction axis CAx and a target machining size TSz, these having been specified by "MA*B*", a tool wear correction amount A$WV having been effective as of then, a correction magnification A$B having been effective as of then, and environmental temperature system thermal displacement amounts A$HCX, A$HCY, and A$HCZ having been effective as of then are added.

Only a piece of data corresponding to the achieved machining size MSz is not added in the above timing point, but is written from a piece of measurement data obtained through an automatic measurement operation performed afterward by a workpiece size measurement device, or is input through a manual operation on a screen described later by a worker on the basis of the result of a measurement of a post-size of the workpiece by the worker.

FIG. 7B is a diagram schematically representing a status in which a machining state data set 251 is extracted. This machining state data set 251 is a set of data used for displaying a machining size graph and extracted from among all pieces of machining state data 250 in a selection data derivation input section 433 (FIG. 8) included in a mid-machining data extraction section 430 of the correction magnification setting support screen 400. The selection data derivation input section 433, the mid-machining data extraction section 430, and the correction magnification setting support screen 400 will be described later. Specifically, in order to generate the machining state data set 251, first, pieces of machining state data each including all of a specified workpiece number WNO, a specified tool number TNO, and a specified correction axis CAx are extracted from among all pieces of machining state data 250, and the extracted pieces of machining state data are rearranged in order of their machining dates DATE and machining clock times TIME. Next, an aggregate of data is further extracted from among the pieces of data having been extracted through the above operation to generate the machining state data set 251. The aggregate of data is configured such that its beginning is a piece of machining state data 250 including a machining date DATE and a machining clock time TIME, which have been specified as a machining start date, and further, the difference between machining clock times of every two successive pieces of machining state data 250 included in the aggregate of data is smaller than a predetermined time interval.

PRACTICE EXAMPLE 1

Correction Magnification Setting Support Screen

Figure 8:
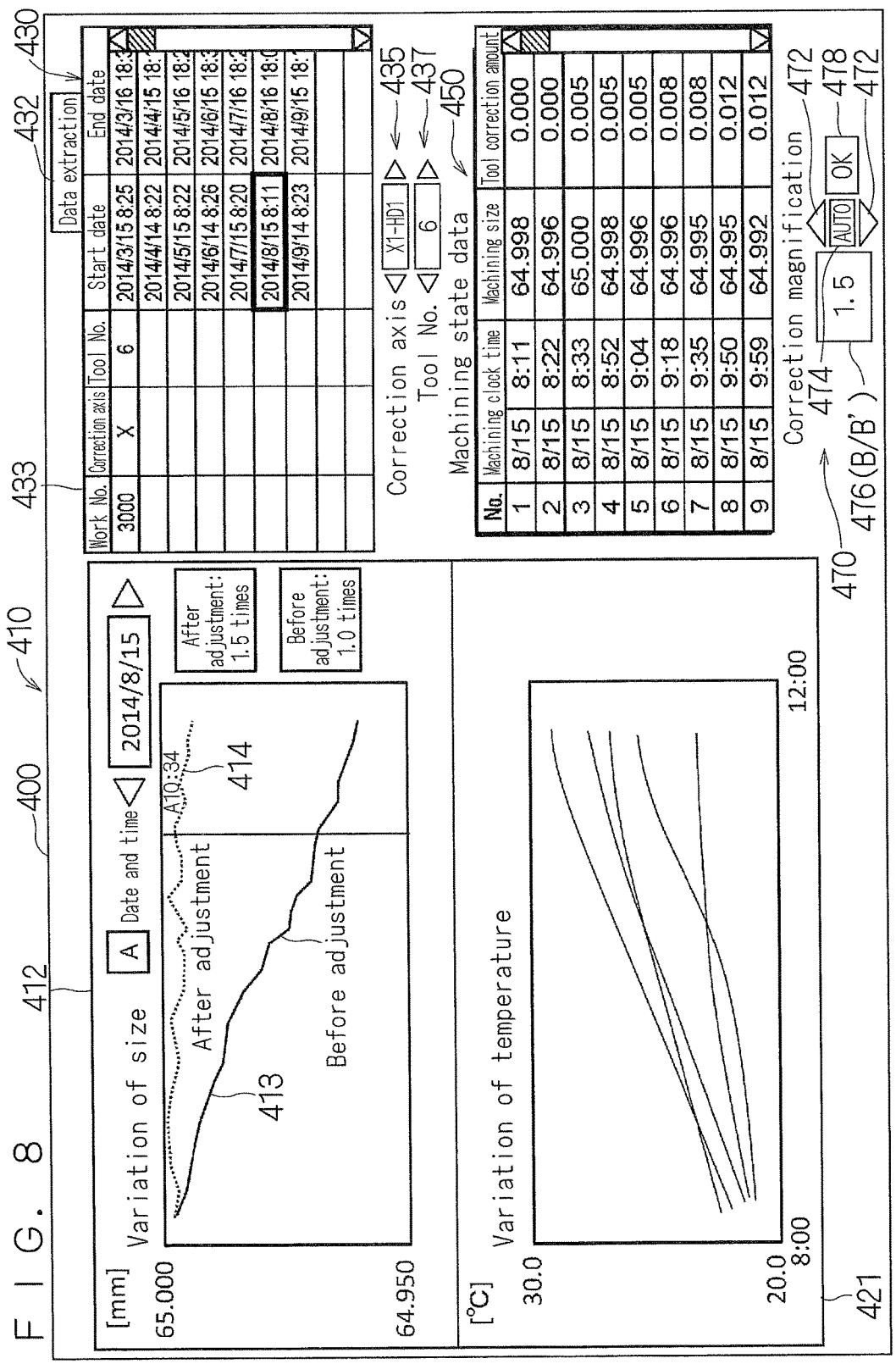
FIG. 8 is a diagram illustrating a correction magnification setting support screen according to first embodiment.

The correction magnification setting support screen 400 is illustrated in FIG. 8 as first embodiment. The correction magnification setting support screen 400 includes a graph display section 410, a machining state data extraction section 430, the machining state data input/display section 450, and a correction magnification adjustment operation section (a correction magnification adjustment operator) 470.

The graph display section 410 includes the machining size graph display section 412 and the temperature graph display section 421. The machining size graph display section 412 is displayed in an upper portion of the graph display section 410 and the temperature graph display section 421 is displayed in a lower portion of the graph display section 410.

The machining state data extraction section 430 includes a data extraction mode switch section 432, the selection data derivation input section 433, a correction axis change/display section 435, and a tool number change/display section 437.

The correction magnification adjustment operation section 470 includes a correction magnification increase/decrease switch 472, an optimum correction magnification calculation switch 474, a correction magnification display portion 476, and a correction magnification determination switch 478.

Next, the function of each of the constituent sections will be described.

Upon operation of the machining state data extraction section 430, a machining state data set 251 targeted for a graphical display on the correction magnification setting support screen 400 is extracted from among a large number of pieces of machining state data 255 having been accumulated for a long period.

Upon operation of the data extraction mode switch 432, all of workpiece numbers recorded in all pieces of machining state data 250 are displayed in order of numbers of the workpiece numbers in a column corresponding to "workpiece No." in the selection data derivation input section 433. The contents of all of the other columns become blank.

Upon selection of a specific workpiece number from among the displayed work numbers WNO through an operation of touching the screen or any other operation, only pieces of machining state data 250 each including the selected workpiece number are extracted. Further, combinations of a correction axis CAx and a tool number TNO, these combinations existing in the extracted pieces of machining state data 250, are displayed in columns corresponding to "correction axis" and "tool No." in the selection data derivation input section 433.

Upon selection of a specific combination of a specific correction axis CAx and a specific tool number TNO among the displayed combinations of a correction axis CAx and a tool number TNO through an operation of touching the screen or any other operation, only pieces of machining state data 250 each including all of the specified workpiece number WNO, the specified correction axis CAx, and the specified tool number TNO are extracted.

Further, the extracted pieces of machining state data 250 are rearranged in order of their machining dates DATA and machining times TIME. When the difference between machining clock times of two successive pieces of machining state data 250 among the rearranged pieces of machining state data 250 is smaller than a predetermined time interval, machining operations corresponding to the respective two successive pieces of machining state data 250 are regarded to have been continuously performed. Further, when the difference between machining clock times of two successive pieces of machining state data 250 among the rearranged pieces of machining state data 250 is larger than or equal to a predetermined time interval, continuous machining operations are regarded to have ended between the two successive pieces of machining state data 250, and the rearranged pieces of machining state data 250 are split into a plurality of aggregates of successive machining data.

For each of the split aggregates of successive machining data, a machining date DATE included in a beginning piece of data and a machining date DATE included in a last piece of data are respectively set as a machining start date and a machining end date, and are respectively listed and displayed in a column corresponding to "start date" and a column corresponding to "end date" in the selection data derivation input section 433.

Upon selection of a specific start date among the displayed machining start dates through an operation of touching the screen, or any other operation, a machining state data set 251 to be displayed in the form of a graph is fixed.

The correction axis change/display section 435 includes the function of changing and displaying an axis targeted for changing the setting of a correction magnification.

In a state in which a machining state data set 251 has been extracted through the above-described operation of the selection data derivation input section 433, a correction axis CAx included in the extracted machining state data set 251 is displayed. In this state, upon change of a correction axis through an operation of the change switch, pieces of machining state data 250 including a latest clock time among pieces of machining state data 250 each including the specified workpiece number WNO and the specified tool number TNO, which have been set above, and including the changed correction axis CAx are extracted as a machining state data set 251.

Further, when a new machining state data set 251 has been extracted, pieces of machining state data 250 each including all of extraction conditions, that is, the specified workpiece number WNO, the specified correction axis CAx, and the specified tool number TNO, are extracted. Further, the extracted sets of machining state data 250 are rearranged in order of their machining dates DATE and machining clock times TIME, and machining start dates and machining end dates are listed and displayed in the machining state data extraction section 430 in a state in which a mark indicating a latest machining start date is appended.

Here, in the case where there is no piece of machining state data 250 including the specific workpiece number WNO and the specific tool number TNO, which have been set above, and including the changed correction axis CAx, an alarm indication or any other notice is performed and the change of the mid-machining data set 251 is not made. In this regard, however, the changed correction axis is displayed as it is, and when the change of a tool number, which will be described next, is made, sets of machining state data are extracted on the basis of the changed correction axis and a new tool number.

The tool number change/display section 437 includes the function of changing and displaying a tool number TNO targeted for changing the setting of a correction magnification.

In a state in which a machining state data set 251 have been extracted through the above-described operation of the selection data derivation input section 433, a tool number TNO included in the extracted machining state data set 251 is displayed. In this state, upon change of a tool number through an operation of the change switch, pieces of machining state data 250 including a latest clock time among pieces of machining state data 250 each including the specified workpiece number WNO and the specified correction axis CAx, which have been set above, and including the changed tool number TNO are extracted as a machining state data set 251.

Here, in the case where there is no piece of machining state data 250 including the specified workpiece number WNO and the specified correction axis CAx, which have been set above, and including the changed tool number TNO, an alarm indication or any other notice is performed and the change of the machining state data set 251 is not made.

Upon extraction of a machining state data set 251, a graph of machining sizes is displayed on the basis of achieved machining sizes MSz included in the extracted machining state data set 251 and machining clock times TIME included in the extracted machining state data set 251. The graph display of the machining sizes will be described later.

Further, when the screen is switched to the correction magnification setting support screen 400, a previously extracted machining state data set 251 is retained and the screen is displayed using this retained extracted machining state data set 251, which has been used for a previous display.

Pieces of data included in the extracted machining state data set 251 are displayed in the machining state data input/display section 450. Here, only a column corresponding to "machining size" allows movement of a cursor and manual inputting of numerical values. Through the use of this machining state data input/display section 450, a worker having measured the size of a workpiece after a machining operation is able to input the measured size of the workpiece as an achieved machining size MSz of a piece of machining state data 250. The measurement of the machining size is not necessarily made on all machining work pieces, but, in accordance with a tendency of the variation of the machining size, there is a case in which the measurement is made every machining operation, or a case in which the measurement is made in accordance with a predetermined frequency, such as once every five machining operations, or once every ten minutes. Accordingly, there is also a case in which the achieved machining size MSz remains blank. Further, in the case of an automatic measurement, the achieved machining size MSz is already input at the time of the completion of a machining operation.

The correction magnification increase/decrease switch 472 of the correction magnification adjustment operation section 470 is a switch for increasing or decreasing a correction magnification in units of 0.1. When the screen has been switched to the correction magnification setting support screen 400, a correction magnification B is displayed in the correction magnification display section 476, and through the operation of the correction magnification increase/decrease switch 472, the correction magnification is changed.

Here, during a period from the change of the correction magnification until an operation of pushing the correction magnification determination switch 478, since the changed correction magnification is not used in an actual estimation calculation for obtaining a thermal displacement amount, the changed correction magnification is caused to be displayed in a blinking state in the correction magnification display section 476 to clearly indicate that the displayed correction magnification is temporal. A correction magnification in this state will be referred to as "a temporal correction magnification B'" hereinafter. This temporal correction magnification B' is used in a calculation for displaying a post-adjustment machining size graph 414 in a machining size graph display section 412 described later.

Here, although it has been described above that a unit for use in the increase/decrease of the correction magnification by the correction magnification increase/decrease switch 472, and for use in the rounding of numerical values in the calculation of an optimum correction magnification is "0.1", the unit is not limited to "0.1". The unit for use in the increase/decrease may be optionally set by setting the unit using a parameter or any other means.

Further, upon operation of the optimum correction magnification calculation switch 474 of the correction magnification adjustment section 470, an optimum correction magnification is calculated and a magnification resulting from rounding in the units of 0.1 is displayed in a blinking state in the correction magnification display section 476. That is, a correction magnification having been calculated upon operation of the optimum correction magnification calculation switch 474 is set as the temporal correction magnification B', and allows the post-adjustment machining size graph 414 to be displayed in the machining size graph display section 412. A manual adjustment using the correction magnification increase/decrease switch 472 can be also made before operating the correction magnification determination switch 478. The details of processing for calculating the optimum correction magnification will be described later.

A graph representing a status in which a machining size varies along with an elapse of time is displayed in the machining size graph display section 412 on the basis of the extracted machining state data set 251. A pre-adjustment machining size graph 413 is displayed in a full line on the basis of achieved machining sizes MSz included in the machining state data set 251, having been obtained through the above operations. A post-adjustment machining size graph 414 is displayed in a dotted line in a form in which its displayed position is shifted upward/downward in a region adjacent to the pre-adjustment machining size graph 413 in conjunction with the adjustments of the temporal correction magnification B'. Processes of displaying the machining size graphs will be described later.

In the temperature display section 421, a status in which measured temperature values of all of the temperature sensors 81 to 90, disposed in the machine tool, vary along with an elapse of time is displayed in the form of a graph on the same time axis as that of the above machining size graph. Here, the measured temperature values of all of the temperature sensors 81 to 90 are recorded so as to be associated with clock times at intervals of a predetermined period of time.

This graph display enables one or more temperature sensors indicating abnormal temperature transitions to be discovered, and this discovery of the abnormal temperature transitions enables countermeasures to be taken before the adjustment of a correction magnification. For example, the estimation of the environmental temperature system thermal displacement amount does not assume that heat is applied to, or lost from, a specific portion of members constituting the machine tool due to an external cause. Thus, when wind from an air conditioner or a blower of an adjacent machine directly blows against a specific portion of the machine tool, a situation in which a thermal displacement is beyond the scope of a correction using a correction magnification is likely to occur. The temperature graph display section 421 is effective in facilitating the discovery of such a situation, and thus, it can be said that the temperature graph display section 421 is an important supporting function in operation of the correction function using the correction magnification.

Machining Size Graph Display Processing

Figure 9:
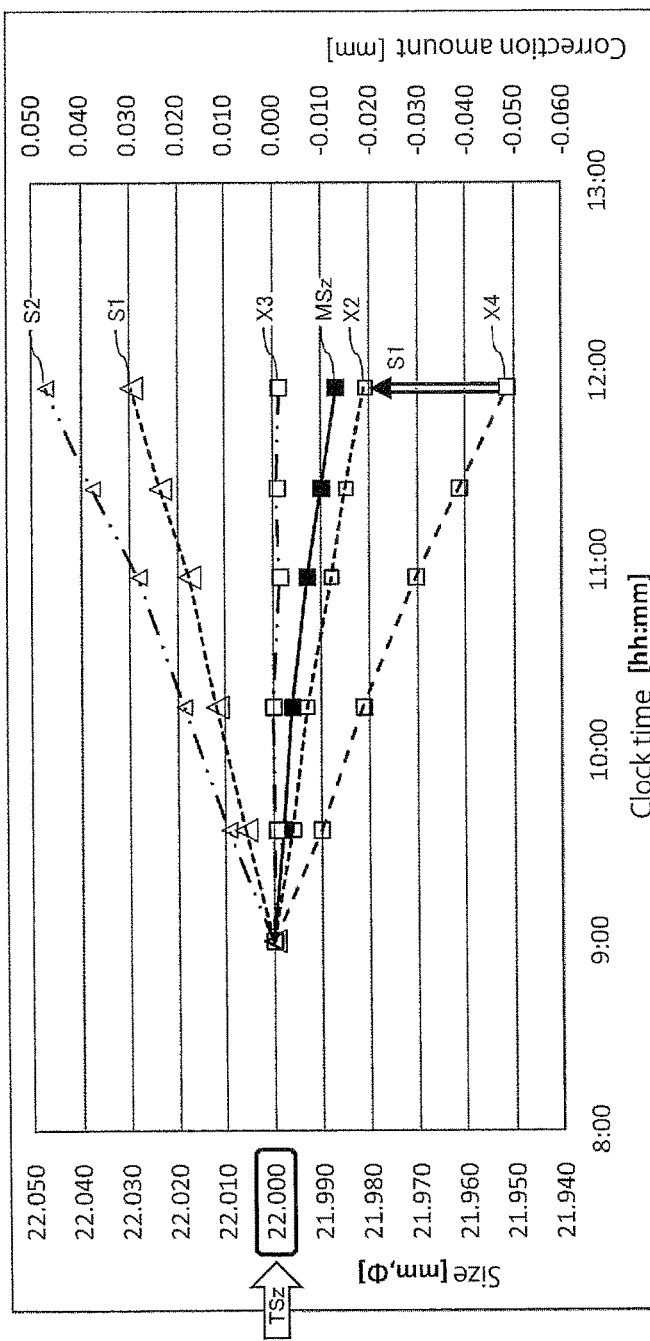
FIG. 9 is a diagram illustrating a graph display according to first embodiment.

FIG. 9 is a diagram illustrating processing for displaying a machining size graph in the correction magnification setting support screen 400. Here, it is omitted in FIG. 9 that the correction axis CAx corresponds to the X-axis, and the target machining size TSz corresponds to ϕ22.0 mm.

First, data inside a table in FIG. 9 will be described.

TIME denotes machining clock times.

MSz denotes achieved machining sizes included in a machining state data set 251. A graph MSz shown in a full line in FIG. 9 is a graph representing a temporal variation of the achieved machining sizes A$WV denotes tool wear correction amounts included in the machining state data set 251.

T1, T2, T3, and T4 each denote measured temperature values of a corresponding one of temperature sensors disposed in individual portions of the machine tool. Here, description will be made by way of an example in which four temperature sensors are disposed.

X2 denotes calculation values of machining sizes in the case where the tool wear correction amounts A$WV, each having been effective on an achieved machining size MSz at the same clock time, are focused and corrections in accordance with the tool wear correction amounts A$WV are not made (hereinafter, X2 being referred to as "a tool wear correction-free calculation-based machining size"). Specifically, X2 is calculated with a formula: X2=MSz−A$WV.

S1 denotes environmental temperature system thermal displacement correction amounts having been applied during a machining operation (hereinafter, S1 being referred to as "an originally applied thermal displacement correction amount"). Since the correction axis CAx corresponds to the X-axis, S1 corresponds to data in relation to the environmental temperature system thermal displacement correction amount A$HCX in the machining state data set 251. Specifically, S1 is represented by a formula: S1=A$HCX.

X4 denotes calculation values of machining sizes in the case where, for each of the tool wear correction-free calculation-based machining sizes X2, an originally applied thermal displacement correction amount S1 corresponding to the same clock time is further focused and a correction in accordance with the originally applied thermal displacement correction amount S1 is not made. That is, X4 corresponds to calculation values of machining sizes in the case where any tool wear correction and any environmental temperature system thermal displacement correction are not made. Hereinafter, X4 will be referred to as "a tool wear correction-free and thermal displacement correction-free calculation-based machining size". Specifically, X4 is calculated with a formula: X4=X2−S1.

An arrow S1 shown in the graph of FIG. 9 denotes an applied thermal displacement amount at a relevant clock time. It is shown that thermal displacement corrections using originally applied thermal displacement correction amounts S1 are made on tool wear correction-free and thermal displacement correction-free calculation-based machining sizes X4 to obtain tool wear correction-free calculation-based machining sizes X2. That is, it can be said in other words that the graph representing transition of X2 indicates, in a state in which positioning in accordance with a target machining size TSz has been performed, coordinate values of actually positioned cutting edge positions in a state in which thermal displacement corrections are applied. That is, misalignments with a target position, that is, displacement amounts that remain behind because of insufficient corrections even though thermal displacement corrections are applied, appear as the graph representing transition of X2. Accordingly, it can be said that the graph representing transition of X2, which represents the tool wear correction-free calculation-based machining sizes X2, is an example of the temporal transition of environmental temperature system thermal displacement corrections.

When the value of a target machining size TSz (i.e., 22.000) is subtracted from the value of a tool wear correction-free and thermal displacement correction-free calculation-based machining size X4 at a clock time 11:55 (i.e., 21.951) and the sign of a resultant value is inverted, an optimum thermal displacement correction amount at the clock time (i.e., 0.049) is obtained. When this value is divided by an originally applied thermal displacement correction amount S1 at the clock time 11:55 (i.e., 0.030), a value, 1.63, is obtained. This shows that, when the correction magnification is multiplied by 1.63, machining sizes approximately equal to a target machining size are obtained even though the tool wear correction is not made. The temporal correction magnification B' is a value in units of 0.1 when manually set, and thus, here, becomes 1.6 resulting from rounding of 1.63. This resultant value corresponds to the aforementioned optimum correction magnification calculation value.

S2 denotes correction amounts resulting from multiplying the originally applied thermal displacement correction amounts S1 by 1.6, which is the temporal correction magnification B'. Hereinafter, S2 will be referred to as "an adjusted temporal correction magnification-based thermal displacement amount".

X3 is obtained through corrections of the tool wear correction-free and thermal displacement correction-free calculation-based machining sizes X4 with the adjusted temporal correction magnification-based thermal displacement amounts S2. That is, X3 denotes calculation-based machining sizes resulting from applying an adjusted temporal correction magnification. Hereinafter, X3 will be referred to as "an adjusted temporal correction magnification-based calculation-based machining size"

The machining size graph display section 412 of the correction magnification setting support screen 400 in FIG. 8 displays the tool wear correction-free calculation-based machining sizes X2, having been described above, and the adjusted temporal correction magnification-based calculation-based machining sizes X3, having been described above. The tool wear correction-free calculation-based machining sizes X2 correspond to the pre-adjustment machining size graph 413, and are shown in the form of a graph in a full line. Further, the adjusted temporal correction magnification-based calculation-based machining sizes X3 corresponds to the post-adjustment machining size graph 414, and are shown in the form of a graph in a dotted line.

Heretofore, a process in which the temporal correction magnification B' is automatically calculated has been described, and a process in which the temporal correction magnification B' is manually set is performed likewise. That is, at the time immediately after the extraction of a machining state data set 251 targeted for displaying the machining size graph, only the pre-adjustment machining size graph 413 is displayed. Here, when the temporal correction magnification B' is increased, the post-adjustment machining size graph 414 is displayed above the pre-adjustment machining size graph 413. The more the temporal correction magnification B' is increased, the more upper position the graph is shifted to. In contrast, when the temporal correction magnification B' is reduced, the post-adjustment machining size graph 414 is displayed below the pre-adjustment machining size graph 413. The more the temporal correction magnification B' is reduced, the more lower position the graph is shifted to. Consequently, this operation of allowing the post-adjustment machining size graph 414 to be shifted to a region which is positioned adjacent to the target machining size TSz, and in which the graph 414 fluctuates, enables determination of a correction magnification.

After having allowed the post-adjustment machining size graph 414 to be shifted upward/downward in such a way described above, a worker is able to visually confirm whether or not the post-adjustment machining size graph 414 is fluctuating in a region adjacent to the target machining size TSz. That is, the effect of a correction with a correction magnification is represented in a visual form, and thus, the worker is able to confidently determine an optimum correction magnification.

Figure 10:
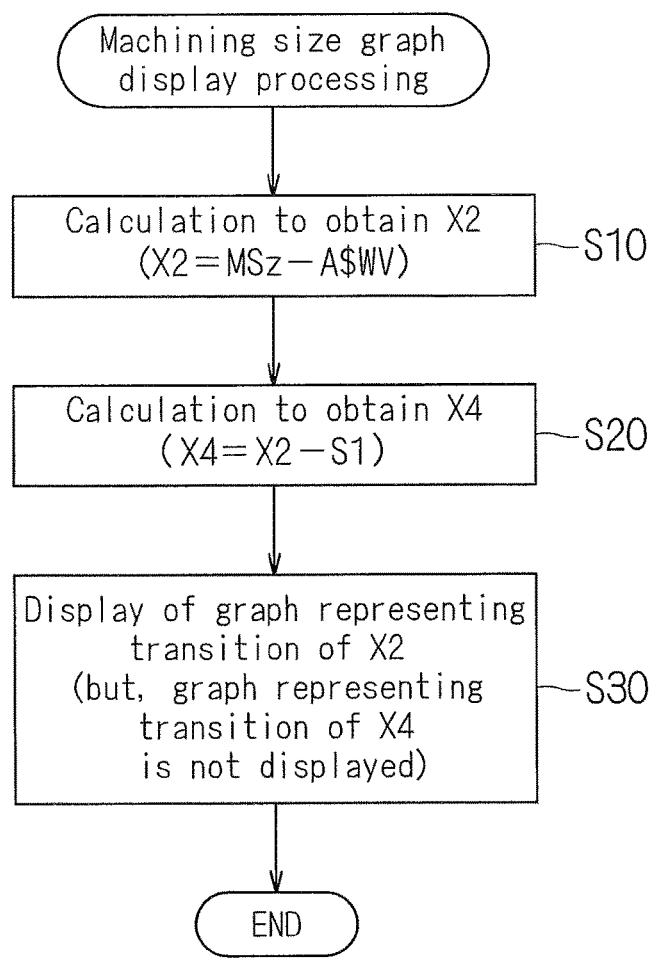
FIG. 10 is a diagram illustrating a flowchart when graph display processing according to first embodiment is performed.

FIG. 10 is a flowchart illustrating a procedure of machining size graph display processing. This flowchart will be described below on the basis of the data shown in FIG. 9.

Upon extraction of a machining state data set 251 to be displayed in the correction magnification setting support screen 400, this processing is started. Arithmetic processing portions in the following individual steps are executed by the CPU 100 using predetermined programs stored in the system program memory 121.

At step S10, the CPU 100 calculates tool wear correction-free calculation-based machining sizes X2 from achieved machining sizes MSz included in the machining state data set 251 and tool wear correction amounts A$WV included in the machining state data set 251. That is, the CPU 100 executes calculations using a formula: X2=MSz−A$WV.

Next, at step S20, the CPU 100 calculates tool wear correction-free and thermal displacement correction-free calculation-based machining sizes X4 from the tool wear correction-free calculation-based machining sizes X2. The tool wear correction-free and thermal displacement correction-free calculation-based machining sizes X4 are machining sizes on which any environmental temperature system displacement correction using the environmental temperature system thermal displacement correction amounts A$HCX, A$HCY, and A$HCZ are not made, and are obtained using the above-described formula: X4=X2−S1. In the case of the data shown in FIG. 9, since the correction axis CAx corresponds to the X-axis, S1 is represented by a formula: S1=A$HCX. The tool wear correction-free and thermal displacement correction-free calculation-based machining sizes X4 are used in optimum correction magnification calculation processing described below and a graph display in a manual setting described below, and thus, are calculated in this step in advance.

Finally, at step S30, the tool wear correction-free calculation-based machining sizes X2 are displayed in the form of a graph. This graph corresponds to the pre-adjustment machining size graph 413 shown in FIG. 8. It should be noted that the tool wear correction-free and thermal displacement correction-free calculation-based machining sizes X4 are not displayed in the form of a graph at this time.

Figure 11:
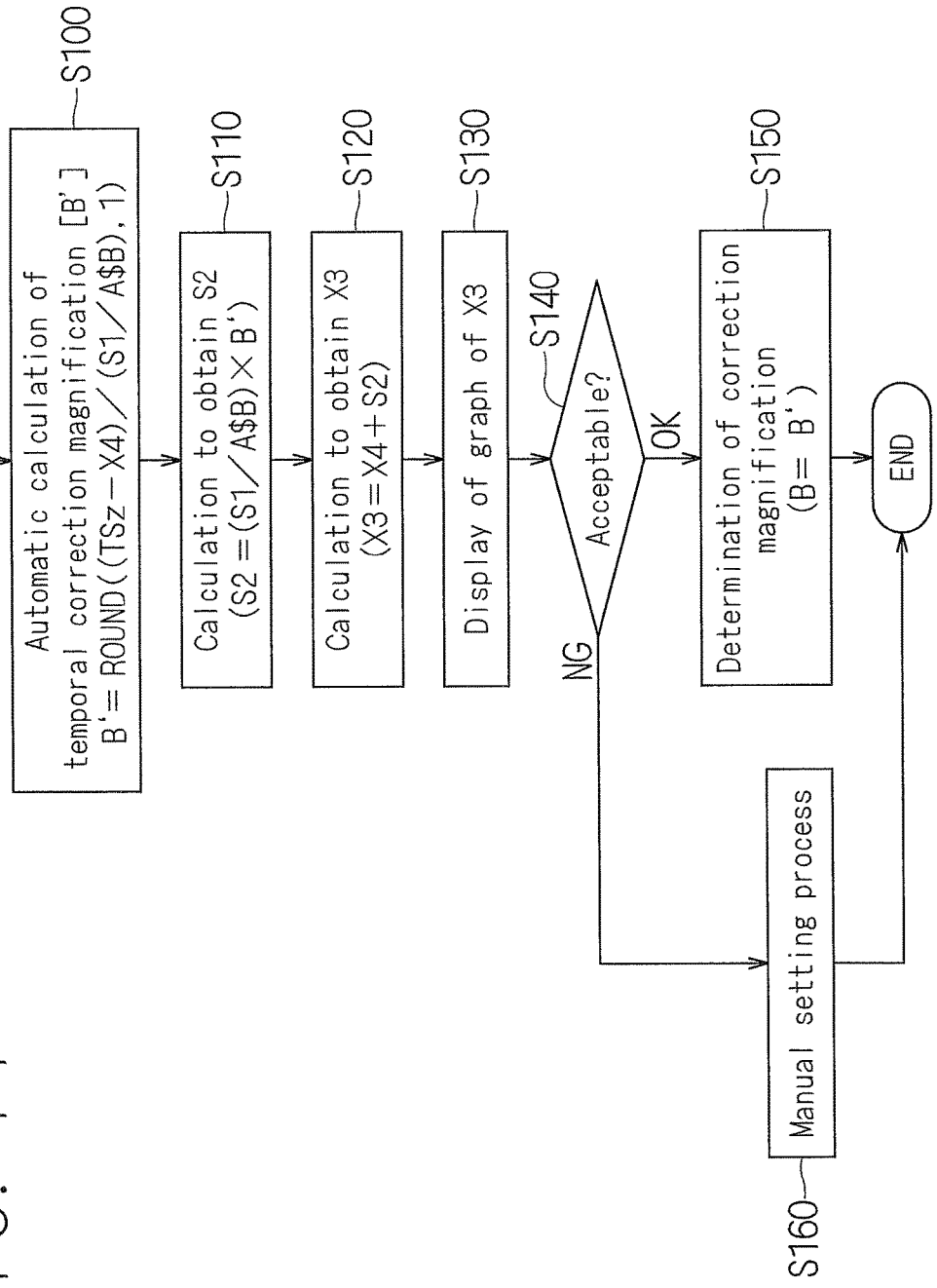
FIG. 11 is a diagram illustrating a flowchart when an optimum correction magnification calculation according to first embodiment is performed.

FIG. 11 is a flowchart illustrating a procedure of optimum correction magnification calculation processing.

In a state in which a machining state data set 251 to be displayed has been extracted and the pre-adjustment machining size graph 413 is displayed, upon operation of the optimum correction magnification calculation switch 474 by a worker, this processing is started. Arithmetic processing portions in the following individual steps are executed by the CPU 100 using predetermined programs stored in the system program memory 121.

At step S100, the CPU 100 calculates a temporal correction magnification B'. That is, for a latest time clock in the displayed pre-adjustment machining size graph 413, the CPU 100 first calculates the difference between a value of the target machining size TSz and a value of a tool wear correction-free and thermal displacement correction-free calculation-based machining sizes X4, that is, a difference value represented by: (TSz−X4). Next, the CPU 100 divides an environmental temperature system thermal displacement amount A$HCX (that is, S1) having been effective at the latest clock time by a correction magnification A$B having been effective at the latest clock time, that is, by a calculation-based thermal displacement amount when the correction magnification A$B is converted into a correction magnification equal to "1", and rounds a resultant value in units of 0.1 to obtain an automatic calculation-based temporary correction magnification B'. The temporary correction magnification B' is obtained by a formula: B'=ROUND ((TSz−X4)/(S1/A$B), 1), which is represented using the originally applied thermal displacement correction amount S1. Calculation processing for calculating the above optimum correction magnification is processing performed by the optimum correction calculation unit. The tool wear correction-free and thermal displacement correction-free calculation-based machining sizes X4 are machining sizes not subjected to the tool wear correction and the thermal displacement correction, and thus, should be target machining sizes even though the tool wear correction is not made, provided that differences with the target machining size are regarded as thermal displacement correction amounts.

After the determination of the temporal correction magnification B', at step S110, the CPU 100 multiplies a value resulting from dividing the originally applied thermal displacement correction amount S1 by an originally applied correction magnification A$B (that is, the CPU 100 multiplies a calculation-based thermal displacement correction amount when the originally applied correction magnification A$B has been converted into the correction magnification equal to "1") by the temporal correction magnification B' to calculate environmental temperature system thermal displacement correction amounts S2, to which the temporal correction magnification has been applied.

Here, it should be noted that, in the description of the machining size graph displaying processing in FIG. 9, in order to make it easier to understand the description, the description has been made on the assumption that the originally applied thermal displacement amount is an amount when the correction magnification is equal to "1", but since there is also a case in which, through the use of pieces of machining state data 250 obtained through a machining operation after a correction magnification has been adjusted once, the correction magnification is further adjusted, the above-described process of dividing by the originally applied correction magnification A$B is added.

At step S120, The CPU 100 adds the environmental temperature system thermal displacement correction amounts S2, to which the temporal correction magnification has been applied, to the tool wear correction-free and thermal displacement correction-free calculation-based machining sizes X4 to calculate X3. X3 becomes calculation-based machining sizes to which the temporal correction magnification is applied.

At step S130, this X3 is displayed in the form of a graph by the graph display program. This graph corresponds to the post-adjustment machining size graph 414.

At step S140, a worker views this graph display to determine whether or not a machining accuracy is improved. In the case where the worker has determined that the machining accuracy has been improved (OK), at step S150, the worker operates the correction magnification determination switch 478 to determine the temporal correction magnification B' as a correction magnification B. Consequently, calculations in relation to a subsequent thermal displacement correction are made using the determined correction magnification B to perform environmental temperature system thermal displacement correction control.

In the case where, at step S140, the worker is not satisfied with a machining accuracy of the post-adjustment machining size graph 414 (NG), the process flow is caused to move to step S160, and as a result, manual setting processing described below will be performed.

FIG. 12 is a flowchart illustrating a procedure of manual setting processing in which a correction magnification is set through a manual operation. This processing is processing performed upon operation of the correction magnification adjustment operation section 470 on the correction magnification setting support screen 400. This processing is performed when, at step S160 in the optimum correction magnification calculation processing illustrated in FIG. 11, a worker is not satisfied with an automatically calculated correction magnification, that is, when the worker changes the automatically calculated correction magnification through the use of the correction magnification adjustment operation section 470.

Before the increase/decrease of the correction magnification, as described above, only the pre-adjustment machining size graph 413, shown in the full line, is displayed in the machining size graph display section 412 by the machining size graph display processing, shown in FIG. 10. With respect to the tool wear correction-free and thermal displacement correction-free calculation-based machining sizes X4, a graph is not displayed but a calculation has already been made. The tool wear correction-free calculation-based machining sizes X2 are values resulting from adding the originally applied thermal displacement correction amounts S1 to the tool wear correction-free and thermal displacement correction-free calculation-based machining sizes X4. Arithmetic processing portions in the following individual steps are executed by the CPU 100 using predetermined programs stored in the system program memory 121.

At step S210, a worker operates the correction magnification switch 472 to manually change the temporal correction magnification B'.

At step S220, the CPU 100 multiplies values having been obtained through the division of the originally applied thermal displacement correction amounts S1 by the originally applied correction magnification A$B by the temporal correction magnification to calculate environmental temperature system thermal displacement correction amounts S2 to which the temporal correction magnification has been applied.

At step S230, the CPU 100 adds the environmental temperature system thermal displacement correction amounts S2, to which the temporal correction magnification has been applied, to the tool wear correction-free and thermal displacement correction-free calculation-based machining sizes X4 to calculate calculation-based machining sizes X3 to which the temporal correction magnification has been applied.

At step S240, the calculation-based machining sizes X3, to which the temporal correction magnification has been applied, are displayed in the form of a graph by the graph display program. This graph corresponds to the post-adjustment machining size graph 414.

At step S250, the worker determines whether or not the post-adjustment machining size graph 414 is acceptable. In the case where the worker has determined that the post-adjustment machining size graph 414 is not acceptable (NG), the process flow is caused to return to step S210, where the worker makes a readjustment of the temporal correction magnification B'.

In the case where the worker has determined that the post-adjustment machining size graph 414 is acceptable, the process flow is caused to proceed to step S260, where the worker operates the correction magnification determination switch 478. With this operation, the temporal correction magnification B' is set as a correction magnification B, and as a result, a subsequent correction magnification B is determined.

Here, when the temporal correction magnification is increased through the operation of the correction magnification increase/decrease switch 472, since the originally applied thermal correction amounts S1 are multiplied by the correction magnification, the display of the post-adjustment machining size graph 414, shown in the dotted line, appears above the pre-adjustment machining size graph 413, shown in the full line. The worker is able to determine a correction magnification by operating the correction magnification increase/decrease switch 472 to cause the post-adjustment machining size graph 414, shown in the dotted line, to be shifted upward/downward so as to determine a preferable correction magnification that allows the post-adjustment machining size graph 414 to be located at a position closest to a target size, and by operating the correction magnification determination switch 478.

As described above, a worker is able to allow the post-machining size graph to be close to a target size by adjusting the correction magnification. Consequently, such an operation that does not make the worker feel uncomfortable remedies a correction amount for the environmental temperature system thermal displacement correction. Accordingly, the conventional situation in which, although a worker has felt that an accurate correction has not been made on the thermal displacement correction, the worker has not been able to make a further correction is eliminated.

Moreover, the purpose of the measurement of machining sizes by a worker is to ensure the accuracy because a tolerance is specified. The use of size values measured by a worker into the calculation of the environmental temperature system thermal displacement correction amounts leads to the measurement of thermal displacement amounts at a position where the highest accuracy is needed, and thus, this configuration enables a highly accurate environmental temperature system thermal displacement correction to be made.

Furthermore, the measurement of a post-machining size is performed to ensure a machining accuracy, and such a measurement is just a regular work for the worker. As a result, a highly accurate adjustment in the environmental temperature system thermal displacement correction is achieved without imposing a new burden on the worker Further, through the use of the optimum correction magnification calculation function, an optimum correction magnification that allows post-adjustment machining sizes to be automatically close to a target value is calculated. Thus, the use of the optimum correction magnification calculation function facilitates the remedy of the environmental temperature system thermal displacement correction amounts by inexperienced workers.

PRACTICE EXAMPLE 2

Practice example 2 in relation to the correction magnification setting support function will be described focusing differences with first embodiment with reference to the drawings.

Figure 13:
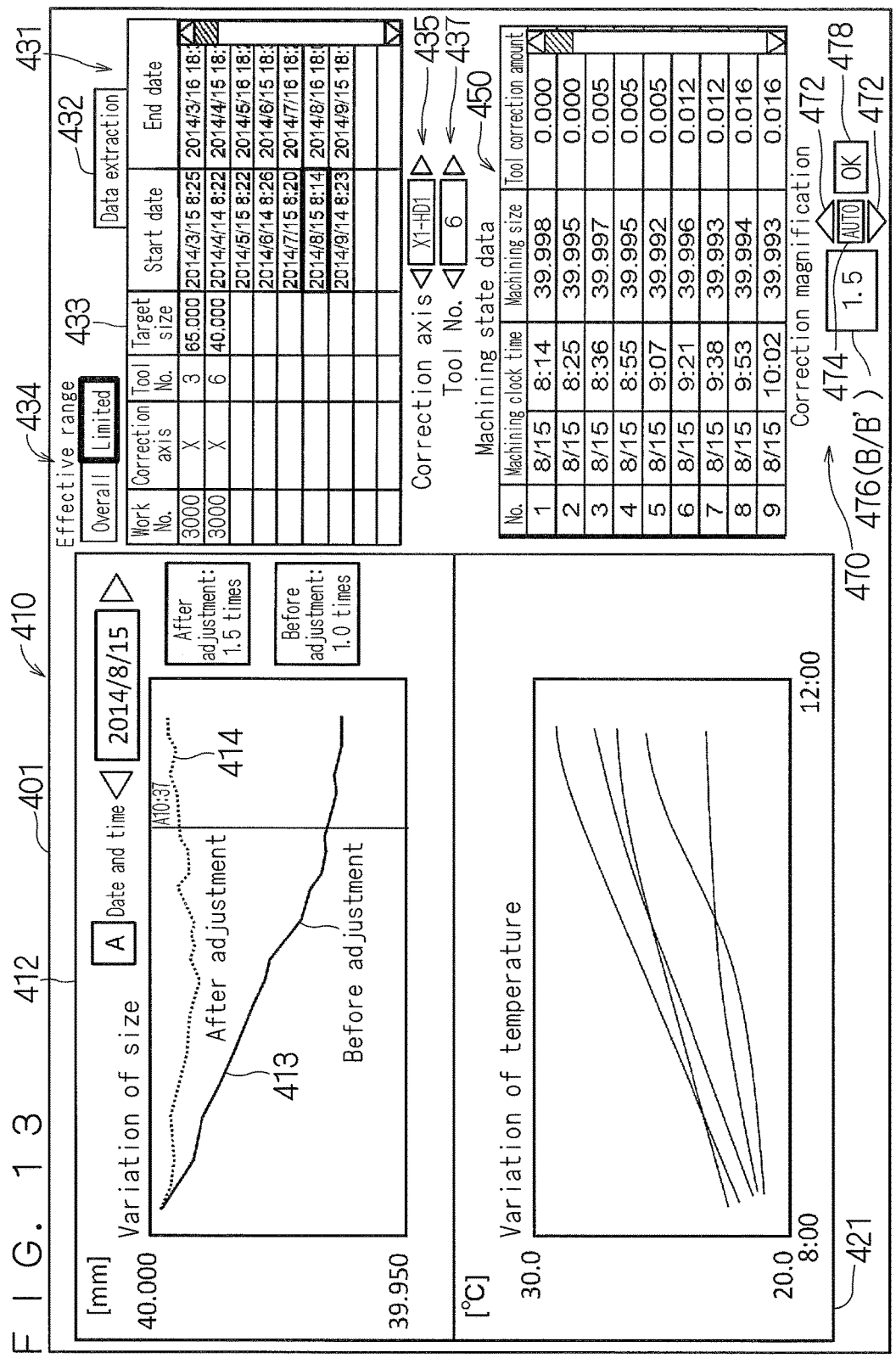
FIG. 13 is a diagram illustrating a display screen according to second embodiment.

FIG. 13 illustrates a correction magnification setting support screen 401 according to second embodiment. In second embodiment, sets of machining state data 250 in relation to a plurality of machining portions are recorded. For this reason, a correction magnification effective range setting/display section 434 is added in a machining state data extraction section 431. In this correction magnification effective range setting/display section 434, an effective range of a correction magnification B is set and displayed.

Further, the way of displaying the selection data derivation input section 433 is different from that of the correction magnification setting support screen 400 (FIG. 8) in first embodiment.

With respect to the display of the selection data derivation input section 433, since sets of machining state data 250 in relation to a plurality of machining portions are recorded during the same machining operation, a display operation in relation to the plurality of machining portions is performed after a workpiece number WNO and a correction axis CAx have been specified. For example, in FIG. 13, a machining portion corresponding to tool number 3 and a machining portion corresponding to tool number 6 are displayed as two machining portions. Further, although an example in which tool numbers are different from each other is shown in FIG. 13, even when displayed tool numbers are the same, in the case where target machining sizes TSz each specified by B of "M**A*B"in a machining program are different from one another, naturally, associated machining portions are different from one another, and thus, there occurs a case in which the same tool number TNO is displayed for each of the associated machining portions. For this reason, a column corresponding to target sizes is added in the selection data derivation input section 433**, and thus, even when displayed tool numbers TNO are the same, a worker is able to properly select his or her desired machining portion.

When sets of machining state data 250 in relation to a plurality of machining portions corresponding to the same workpiece number WNO and the same correction axis CAx have been recorded, even though a correction magnification B is set on the basis of a set of machining state data 250 having been recorded in relation to one of the machining portions, the correction magnification B is not necessarily an optimum correction magnification for another one of the machining portions. For example, with respect to an inner diameter machining operation and an outer diameter machining operation, B-axis positioning angles in the B-axis for the tool spindle are different from each other, and thus, there occurs a case in which the directions and the amounts of thermal displacement amounts are different from each other. Accordingly, correction magnifications are allowed to be changed for each of the machining portions to deal with mutual differences among thermal displacement amounts due to the attitude changes of members constituting the machine tool.

The correction magnification effective range setting/display section 434 is an operative means for changing and displaying an effective range of each of a plurality of correction magnifications having been set on the basis of the sets of machining state data 250 in relation to the plurality of machining portions.

When a correction magnification is set first, the effective range is automatically set to "overall". With this operation, the correction magnification having been set above is applied to all machining operations. When a correction magnification is set on the basis of a set of machining state data 250 in relation to a second machining portion, the effective range is automatically set to "limited". With this operation, the correction magnification is applied to only machining operations on the machining portion. That is, the application of the correction magnification is limited to only finishing machining operations on the machining portion for which the set of machining state data 250 has been recorded. Processes for a third machining portion and subsequent machining portions are similar to the process described above.

There occurs, however, a case in which a correction magnification desired to be applied to a limited machining portion is automatically set to as to be applied to overall machining portions when the order of setting operations is inappropriate. In such a case, an operation of pushing a switch "limited" in a state in which an indication "overall" is lighted enables switching to such a limited application. With this operation, all correction magnifications are set to "limited". In contrast, a machining portion having been set to "limited" is changeable to "overall". With this change operation, a machining portion having been set to "limited" is changed into "overall", whereas the other machining portions having been set to "overall" are set to "limited". Here, when "overall" and "limited" are set as effective ranges, all machining portions other than a machining portion having been set to "limited" fall within an effective range "overall".

PRACTICE EXAMPLE 3

Practice example 3 in relation to the correction magnification setting support function will be described focusing differences with embodiments 1 and 2 with reference to the drawings.

FIG. 14 illustrates a correction magnification setting support screen 402 according to third embodiment. In a graph display section 411 on the correction magnification setting support screen 402, a correction amount graph display section 416 is displayed in substitution for the machining size graph display section 412. The correction amount graph display portion 416 displays a temporal transition of environmental temperature system thermal displacement correction amounts in the form of a graph.

Experienced workers are likely to have roughly grasped a tendency of thermal displacement amounts through operations for compensating a machining accuracy, such as measurements of machining sizes and operations of inputting tool wear correction amounts. Such a worker is able to determine whether a thermal displacement correction amount is sufficient or insufficient merely by displaying, in the form of a graph, how thermal displacement correction amounts fluctuate along with an elapse of time. Thus, the correction magnification setting support screen 402 is configured to allow a user to operate a correction magnification increase/decrease switch 472 and display a post-adjustment correction amount graph 418 so as to enable the user to remedy a correction amount.

In order to realize this function, in the NC device, an environmental temperature system thermal displacement correction amount having been effective at each constant time interval and a correction magnification are stored together with a clock time into a memory as an environmental temperature system thermal displacement correction record data set. For this reason, another environmental temperature system thermal displacement correction record data memory is provided. Through the use of a plurality of the stored data sets, with respect to a pre-adjustment correction amount graph 417, recorded environmental temperature system recorded thermal displacement correction amounts are displayed in the form of a graph as they are, whereas with respect to a post-adjustment correction amount graph 418, correction amounts obtained by dividing each of the recorded environmental temperature system thermal displacement correction amounts by the recorded correction magnification, and by multiplying each of resultant values by a temporal correction magnification B' are displayed in the form of a graph. Accordingly, this correction magnification setting support device needs no operation of manually inputting machining sizes, and thus, a burden imposed on a worker is further reduced.

Other Embodiments

Embodiments according to the present invention are not limited to the aforementioned individual embodiments. For example, modifications described below may be made on the aforementioned embodiments.

In the aforementioned embodiments, a machine tool is embodied as the machine tool in which five axes, that is, the sum of three linear axes and two rotating axes, are controlled, but the present invention is also applicable to a lathe including two linear axes, and a vertical or horizontal machining center including three linear axes. Further, the above description has been made using a cutting machining program, but the present invention is applicable to a program for a machining operation using a rotating tool.

In the aforementioned embodiments, the description has been made using the driving system thermal displacement amount estimation unit and the environmental temperature system thermal displacement amount estimation unit, but the present invention is applicable to a configuration in which, in substitution for or in addition to the driving system thermal displacement amount, any heat generation member and/or any heat discharge member are provided. In such a case, a thermal displacement amount based on a specific heat generation member and/or a specific heat discharge member may be estimated to make an overall correction on a total thermal displace amount including the environmental temperature system thermal displacement amount.

Further, the machining state data may be stored in an external storage medium. This configuration enables, for each of seasonal environmental variations, a corresponding suitable correction magnification to be set on the basis of a plurality of pieces of machining state data during one year or past several years, and thus, enables, for each of variations of the environmental temperature system thermal displacement amount along with the variations of the installation environment of the machine tool, a corresponding appropriate measure to be taken in advance.

In the device disclosed in Japanese Patent No. 5490304, the position of the measurement of the thermal displacement amount is fixed, and further, the position is set at a position far from a machining position. Thus, it cannot be said that a thermal displacement amount at a position where a machining operation is actually performed is correctly measured. Further, no consideration is given to a situation in which, even when the positioning of a blade edge has been made onto the same position, a thermal displacement amount at the position of the blade edge varies in accordance with change of the attitude of the machine tool. Moreover, in order to increase the correction accuracy, although a function of prompting the change of a correction coefficient is implemented, the function causes a worker to remain passive, and does not allow the worker to change the correction coefficient actively at his or her will.

In the device disclosed in Japanese Unexamined Patent Application Publication No. 60-228055, for a thermal displacement during a time when the temporal variation of a thermal expansion is significantly large immediately after a working operation has been started, machining size displacement amounts having been actually measured in advance are used as thermal displacement correction values as they are, but this configuration is limited to machining operations on the same workpiece and has a room for improvement in versatility.

Meanwhile, in the device disclosed in Japanese Unexamined Patent Application Publication No. 2006-116663, since a present spindle speed and a spindle load are detected, and through the use of a calculation formula based on a previously estimated thermal displacement, an actual thermal displacement amount is estimated, it can be said that the spindle is the largest heat source, and the state of the spindle is accurately reflected. In this configuration, however, the heat source is not only the spindle, and a thermal displacement amount that increases/decreases along with, for example, the variation of environmental temperature also arises, but this kind of thermal displacement amount is not taken into consideration.

Moreover, environmental temperature system thermal displacement amounts in relation to a machine tool depend on an environment where the machine tool is installed, and thus, just standard parameters being set at the shipment from a manufacture have been not enough to facilitate obtaining accurate environmental temperature system thermal displacement amounts. For example, even for the same machine tool, environmental temperature system thermal displacement amounts largely depend on various environmental conditions, such as a condition in which heating equipment is working under a closed environment in the winter season, a condition in which cooling equipment is working under a closed environment during the summer season, and a condition in which a factory is under an open environment during the spring season or the autumn season. Further, there has not existed any machine tool configured to, when estimating and correcting environmental temperature system thermal displacement amounts, take into consideration various conditions in relation to an environment where the machine tool is installed. Thus, when a situation in which the environmental temperature system thermal displacement correction is not accurately made occurs, the change of a coefficient for use in an estimation calculation formula for the estimation of environmental temperature system thermal displacement amounts is needed to deal with such a situation. In this case, however, any person other than an expert engineer who understands the estimation calculation formula has not been able to deal with such a situation.

The embodiments of the present invention improve the situations.

Hereinafter, aspects for improving the above situations and operation effects of the aspects will be described.

Aspect 1: a machine tool includes a workpiece holding unit configured to hold a workpiece, and a tool holding unit configured to hold a tool. At least one of the workpiece holding unit and the tool holding unit are configured to be drivingly rotated, and at least one of the workpiece holding unit and the tool holding unit are configured to be drivingly moved in a predetermined direction so as to machine the workpiece with the tool. The machine tool includes a plurality of temperature sensors attached to members constituting the machine tool, and an environmental temperature system thermal displacement amount estimation unit configured to calculate an environmental temperature system thermal displacement amount on the basis of temperature values each measured by a corresponding one of the plurality of temperature sensors. Further, an environmental temperature system thermal displacement correction amount is calculated by multiplying a calculation-based thermal displacement correction amount for compensating the environmental temperature system thermal displacement amount by a correction magnification, and environmental temperature system thermal displacement correction control is performed on the basis of the environmental temperature system thermal displacement correction amount.

The above machine tool is configured to perform thermal displacement correction control using a correction amount obtained by multiplying a calculation-based thermal displacement correction value for compensating an estimated environmental temperature system thermal displacement amount by a correction magnification. Accordingly, even though thermal temperature system thermal displacement amounts vary in accordance with various environments where the machine tool is installed, this configuration facilitates changing the correction amount through the change of the correction magnification and thus enables dealing with the various environments.

Aspect 2: the machine tool according to technical concept 1 further includes a driving system thermal displacement amount estimation unit configured to calculate a driving system thermal displacement amounts on the basis of a rotation driving state and a movement driving state of each of the workpiece holding unit and the tool holding unit. Further, a total thermal displacement correction amount is obtained by adding the environmental temperature system thermal displacement correction amount to a driving system thermal displacement correction amount for compensating the driving system thermal displacement amount, and thermal displacement correction control is performed on the basis of the total thermal displacement correction amount.

The above machine tool is configured to, when correcting a thermal displacement that occurs in the machine tool, estimate two divided systems of thermal displacement amounts, one being a driving system thermal displacement due to heat sources existing inside the machine tool itself, the other one being an environmental temperature system thermal displacement due to heat sources existing outside the machine tool, and to correct the thermal displacement using a total thermal displacement correction amount resulting from summing the thermal displacement amounts of the respective two systems. Since the driving system thermal displacement amount is a thermal displacement due to the heat sources existing inside the machine tool itself, the analysis of the relationship between an operation state of each of the heat sources and a heat displacement amount has been advanced, and in recent years, this advanced analysis has enabled the driving system thermal displacement amount to be estimated with high accuracy. In contrast, the environmental temperature system thermal displacement, however, is difficult to be estimated with high accuracy because ambient environments of the machine tool are extremely various in conjunction with the variety of places where the machine tool is installed. For this reason, with respect to the environmental temperature system thermal displacement, which is difficult to be estimated with high accuracy, the above machine tool is configured to correct an environmental temperature system thermal displacement by multiplying an estimated correction amount by a correction magnification. Thus, even though there occurs a situation in which the machine tool is placed under an unexpected environment and, as a result, a thermal displacement correction by the machine tool does not work well enough to satisfy an expected good result, this configuration facilities improving such a situation in a simple way.

Aspect 3: in the machine tool according to technical concept 2, a record of an execution result of the environmental temperature system thermal displacement correction control is recorded as a set of environmental temperature system thermal displacement correction record data. The set of environmental temperature system thermal displacement correction record data includes, at minimum, the environmental temperature system thermal displacement correction amount, the correction magnification, which has been applied to the calculation of the environmental temperature system thermal displacement correction amount, and a clock time at which the environmental temperature system thermal displacement correction has been made. A temporal transition of environmental temperature system thermal displacement corrections is displayed in the form of a first graph on the basis of a plurality of the sets of environmental temperature system thermal displacement correction record data. An increase/decrease switch configured to temporarily change a recorded correction magnification, the correction magnification having been recorded in the set of environmental temperature system thermal displacement correction record data, is provided. A temporal transition of environmental temperature system thermal displacement corrections obtained by applying a temporal correction magnification having been changed by the increase/decrease switch to the plurality of environmental temperature system thermal displacement correction record data is displayed in the form of a second graph superimposed on the first graph. A correction magnification determination switch configured to set the temporal correction magnification as the correction magnification is provided.

The above machine tool is configured to record, in the form of data, environmental temperature system thermal displacement corrections having been executed, and to display the temporal transition of the environmental temperature system thermal displacement corrections in the form of a first graph. Moreover, in order to view how the corrections behave when assuming that a correction magnification having been applied to the previously executed thermal displacement corrections is temporarily changed, environmental temperature system thermal displacement corrections based on the changed correction magnification is displayed in the form of a second graph superimposed on the first graph, which represents a current-based temporal transition. The increase/decrease switch is configured to increase/decrease the temporal correction magnification, and this configuration enables determination of an optimum correction magnification through the confirmation of graphs obtained by variously changing the correction magnification. That is, even though there is a worker who does not know any processing algorithm for the environmental temperature system thermal displacement correction, such a worker is also able to determine an optimum correction magnification.

Aspect 4: in the machine tool according to technical concept 3, the set of environmental temperature system thermal displacement correction record data is recorded at intervals of a constant period of time, and the temporal transition of the environmental temperature system thermal displacement corrections includes a temporal transition of a plurality of the environmental temperature system thermal displacement correction amounts.

An experienced worker has grasped an actual wear tendency of the tool on the basis of his or her experiences. Such an experienced worker, therefore, has roughly grasped the behavior of thermal displacements in relation to the machine tool through measurements of machining sizes to ensure their machining tolerances, and operations of inputting tool wear correction amounts to cause the machining sizes to fall within their tolerance ranges. The above machine tool displays the temporal transition of the environmental temperature system thermal displacement correction amounts in the form of a graph, and thus, such an experienced worker as described above, who has roughly grasped the behavior of thermal displacements, is able to, through his or her feeling, whether or not the thermal displacement correction is properly made. Accordingly, when the thermal displacement correction is not properly made and a graph representing environmental temperature system thermal displacement corrections is not matched with the feeling of the experienced worker, an operation of adjusting the temporal correction magnification in a way that allows the graph to be closer to the feeling of the experienced worker enables improvement that allows the thermal displacement correction to be made with higher accuracy.

Aspect 5: in the machine tool according to technical concept 3, the set of environmental temperature system thermal displacement correction record data further includes a correction axis that means a monitoring target axis, an achieved machining size, and a tool wear correction amount having been applied during a machining operation, and the temporal transition of the environmental temperature system thermal displacement corrections is a temporal transition of machining size calculation values in a case where any tool wear connection is not made.

The amount of tool wear caused by execution of a machining operation is a significantly small value as compared with the amount of each of thermal displacements in relation to the machine tool. Thus, here, a tool wear amount input to cause a post-machining size to fall within a tolerance range is regarded as data for compensating the thermal displacement, and a machining size under an assumption that the tool wear amount is equal to zero is calculated to enable the influence of the thermal displacement on a machining accuracy to be displayed in the form of a graph.

Further, an operation of changing an environmental temperature system thermal displacement correction amount having been applied to a completed machining operation by increasing/decreasing the temporal correction magnification enables changing a graph in relation to the calculation-based machining size. Thus, a worker is able to set a correction magnification that allows the graph in relation to the calculation-based machining size to be positioned close to a target size through the confirmation of the position of the graph. Accordingly, even when a worker has not roughly grasped the behavior of the thermal displacements in relation to the machine tool unlike an experienced worker, the worker is able to optimally adjust a correction magnification.

Aspect 6: the machine tool according to technical concept 5 further includes an optimum correction magnification calculation unit configured to calculate a correction magnification that allows a machining size calculation value in a case where any tool wear correction is not made to be approximately equal to a target machining size that the set of environmental temperature system thermal displacement correction record data further includes, and to set the calculated correction magnification as the temporal correction magnification.

In the above machine tool, the optimum correction magnification calculation unit calculates a correction magnification that allows a calculation-based machining size under an assumption that a tool wear amount is equal to zero to be close to a target machining size, and thus, even when a worker is an inexperienced worker, the worker is able to easily remedy the environmental temperature system thermal displacement correction amount.

Moreover, the use of a measurement value of a machining size (i.e., the use of an achieved machining size) leads to the measurement of a thermal displacement amount at a position where the highest accuracy is needed, and a correction magnification is determined using the value of such a thermal displacement amount, and thus, this configuration enables an accurate correction to be made at the position where the highest accuracy is needed.

Aspect 7: in the machine tool according to technical concept 5, the set of environmental temperature system thermal displacement correction record data includes a plurality of sets of environmental temperature system thermal displacement correction record data, and each of the plurality of sets of environmental temperature system thermal displacement correction record data is associated with a corresponding one of a plurality of machining portions of one machining workpiece. Further, a specific correction magnification is obtained on the basis of one of the sets of environmental temperature system thermal displacement correction record data that is associated with a specific machining portion among the plurality of machining portions. Any one of a limited setting and an overall setting is set, the limited setting being a setting that allows the specific correction magnification to be effective when a machining operation is performed on the specific machining portion, the overall setting being a setting that allows the specific correction magnification to be effective when machining operations are performed on overall portions constituting the workpiece and comprising the specific machining portion.

The above machine tool enables setting of mutually different correction magnifications onto a plurality of machining portions, and thus, in a case in which machining operations using the same tool are performed while the attitude of the machine tool is being changed, the machine tool enables dealing with the differences among environmental temperature system thermal displacement amounts due to the mutually different attitudes of the machine tool. In another case in which, for a spindle that needs a long stroke, when machining portions requiring a high machining accuracy are distanced from one another, environmental temperature system thermal displacement amounts are likely to differ in accordance with the positions of the machining portions. In this case as well, an operation of changing correction magnifications for each of the machining portions enables an appropriate environmental temperature system thermal displacement correction to be made on the each of the machining portions, that is, on each of a plurality of portions.

Aspect 8: the machine tool according to technical concept 5 further includes a measurement device configured to automatically perform measurement and writing of the achieved machining size.

The above machine tool enables the achieved machining size to be automatically measured and enables the achieved machining size in the set of environmental temperature system thermal displacement correction record data to be automatically input. This configuration, therefore, enables data acquisition to be made without any input operation by a worker.

Aspect 9: in the machine tool according to technical concept 5, the achieved machining size is input by a worker after the worker has measured a size of the workpiece having been subjected to a machining operation.

In the above machine tool, a situation in which a measurement of an achieved machining size during a machining operation results in a measurement that is performed in a state in which heat generated along with cutting is accumulated in a target workpiece and the target workpiece is thermally expanded, and as a result, an accurate, achieved machining size is difficult to be obtained may occur. In such a case, the above machine tool is configured to allow a worker to, after an elapse of a predetermined period after the completion of the machining operation, manually measure the achieved machining size and then manually input a measured value of the achieved machining size through a screen.

Aspect 10: in the machine tool according to technical concept 5, the set of environmental temperature system thermal displacement correction record data is recorded in response to a data record command executed during a machining operation.

The above machine tool is configured to allow a data record command to be programed in a machining program to enable needed data to be automatically acquired during a machining operation. Further, programming of a machining state data record command at a point immediately after a finishing machining operation enables a set of data among sets of data in relation to an environmental temperature system thermal displacement correction amount that varies time to time to be acquired at a timing point when most needed, and this configuration enables determination of a more accurate correction magnification.

Aspect 11: in the machine tool according to technical concept 4 or technical concept claim 5, the set of environmental temperature system thermal displacement correction record data further includes a plurality of kinds of temperature values each having been measured by a corresponding one of the plurality of temperature sensors. Further, transitions of all of sets of temperature values, each of the sets being associated with a corresponding one of the plurality of kinds of temperature values, are each displayed in a form of a graph on the same time axis as that of the first graph, which represents the temporal transition of the environmental temperature system thermal displacement corrections.

When one or more of the temperature sensors attached to individual members constituting the machine tool, naturally, the environmental temperature system thermal displacement control does not work normally. Further, when wind from an air conditioner or any other similar device directly blows against a specific region on the external face of the machine tool, a thermal displacement behaves differently from an expected thermal displacement. In such a case, taking a measure of eliminating such a situation, that is, a measure of providing a wall in front of the specific region on the external face of the machine tool so as not to cause the wind to directly blow against the specific region is a more understandable solution for users than changing parameters or processes so as to enable a thermal displacement amount adapted to such an environment to be estimated. The above function facilitates discrimination of a failure in the temperature sensors and a local, unexpected temperature state, and thus, eliminates any meaningless effort to cause a thermal displacement correction function implementing a difficult processing algorithm to be normally work.

Obviously, numerous modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A machine tool comprising:
   a workpiece holding unit configured to hold a workpiece;
   a tool holding unit configured to hold a tool, at least one of the workpiece holding unit and the tool holding unit being configured to be drivingly rotated, and at least one of the workpiece holding unit and the tool holding unit being configured to be drivingly moved in a predetermined direction so as to machine the workpiece with the tool;
   a plurality of temperature sensors attached to members constituting the machine tool;
   an environmental temperature system thermal displacement amount estimator configured to calculate an environmental temperature system thermal displacement amount due to a heat source existing outside the machine tool, based on temperature values each measured by a corresponding one of the plurality of temperature sensors;
   a correction magnification processor configured to multiply a calculation-based thermal displacement correction amount for compensating the environmental temperature system thermal displacement amount by a correction magnification value to calculate an environmental temperature system thermal displacement correction amount;
   a correction magnification adjustment operation section configured to adjust the correction magnification value;
   a driving system thermal displacement amount estimator configured to calculate a driving system thermal displacement amount due to a heat source included in the machine tool itself, based on a rotation driving state and a movement driving state of each of the workpiece holding unit and the tool holding unit; and
   a thermal displacement correction amount adder configured to add the environmental temperature system thermal displacement correction amount to a driving system thermal displacement correction amount for compensating the driving system thermal displacement amount to obtain and output a total thermal displacement correction amount based on which the machine tool performs thermal displacement correction control.

2. The machine tool according to claim 1,
   wherein a record of an execution result of the environmental temperature system thermal displacement correction control is recorded as a set of environmental temperature system thermal displacement correction record data,
   wherein the set of environmental temperature system thermal displacement correction record data comprises, at minimum, the environmental temperature system thermal displacement correction amount, the correction magnification value, which has been applied to the calculation of the environmental temperature system thermal displacement correction amount, and a clock time at which the environmental temperature system thermal displacement correction has been made,
   wherein a temporal transition of environmental temperature system thermal displacement corrections is displayed in a form of a first graph, based on a plurality of the sets of environmental temperature system thermal displacement correction record data,
   wherein an increase/decrease switch configured to temporarily change a recorded correction magnification value, the correction magnification value having been recorded in the set of environmental temperature system thermal displacement correction record data, is provided,
   wherein a temporal transition of environmental temperature system thermal displacement corrections obtained by applying a temporal correction magnification value having been changed by the increase/decrease switch to the plurality of sets of environmental temperature system thermal displacement correction record data is displayed in a form of a second graph superimposed on the first graph, and
   wherein a correction magnification determination switch configured to set the temporal correction magnification value as the correction magnification value is provided.

3. The machine tool according to claim 2,
   wherein the set of environmental temperature system thermal displacement correction record data is recorded at intervals of a constant period of time, and
   wherein the temporal transition of the environmental temperature system thermal displacement corrections comprises a temporal transition of a plurality of the environmental temperature system thermal displacement correction amounts.

4. The machine tool according to claim 2,
   wherein the set of environmental temperature system thermal displacement correction record data further comprises a correction axis that corresponds to a monitoring target axis in a graph, an achieved machining size, and a tool wear correction amount having been applied during a machining operation, and
   wherein the temporal transition of the environmental temperature system thermal displacement corrections comprises a temporal transition of machining size calculation values in a case where any tool wear correction is not made.

5. The machine tool according to claim 4 further comprising an optimum correction magnification calculator configured to calculate a correction magnification value that allows a machining size calculation value in a case where any tool wear correction is not made to be approximately equal to a target machining size that the set of environmental temperature system thermal displacement correction record data, and the optimum correction magnification calculator is further configured to set the calculated correction magnification value as the temporal correction magnification value.

6. The machine tool according to claim 4,
wherein the set of environmental temperature system thermal displacement correction record data comprises a plurality of sets of environmental temperature system thermal displacement correction record data, and each of the plurality of sets of environmental temperature system thermal displacement correction record data is associated with a corresponding one of a plurality of machining portions of one machining workpiece, and
wherein a specific correction magnification value is obtained based on one of the sets of environmental temperature system thermal displacement correction record data that is associated with a specific machining portion among the plurality of machining portions, and any one of a limited setting and an overall setting is set, the limited setting being a setting that allows the specific correction magnification value to be effective when a machining operation is performed on the specific machining portion, the overall setting being a setting that allows the specific correction magnification value to be effective when machining operations are performed on overall portions constituting the workpiece and comprising the specific machining portion.

7. The machine tool according to claim 4 further comprising a measurement device configured to automatically perform measurement and writing of the achieved machining size.

8. The machine tool according to claim 4, wherein the achieved machining size is input by a worker after the worker has measured a size of the workpiece having been subjected to a machining operation.

9. The machine tool according to claim 4, wherein the set of environmental temperature system thermal displacement correction record data is recorded in response to a data record command executed during a machining operation.

10. The machine tool according to claim 3,
wherein the set of environmental temperature system thermal displacement correction record data further comprises a plurality of kinds of temperature values each having been measured by a corresponding one of the plurality of temperature sensors, and
wherein transitions of all of sets of temperature values, each of the sets being associated with a corresponding one of the plurality of kinds of temperature values, are each displayed in a form of a graph on a same time axis as a time axis of the first graph, which represents the temporal transition of the environmental temperature system thermal displacement corrections.

11. The machine tool according to claim 4,
wherein the set of environmental temperature system thermal displacement correction record data further comprises a plurality of kinds of temperature values each having been measured by a corresponding one of the plurality of temperature sensors, and
wherein transitions of all of sets of temperature values, each of the sets being associated with a corresponding one of the plurality of kinds of temperature values, are each displayed in a form of a graph on a same time axis as a time axis of the first graph, which represents the temporal transition of the environmental temperature system thermal displacement corrections.

12. The machine tool according to claim 1, wherein the correction magnification adjustment operation section is a user interface configured to receive input from a user to adjust the correction magnification value.

* * * * *